(12) United States Patent
Ohshima

(10) Patent No.: US 11,893,721 B2
(45) Date of Patent: Feb. 6, 2024

(54) DEFECT DETECTION APPARATUS AND MEDIUM

(71) Applicant: NIKON-TRIMBLE CO., LTD., Tokyo (JP)

(72) Inventor: Yuichi Ohshima, Kawasaki (JP)

(73) Assignee: NIKON-TRIMBLE CO., LTD., Tokyo (JP)

( * ) Notice: Subject to any disclaimer, the term of this patent is extended or adjusted under 35 U.S.C. 154(b) by 11 days.

(21) Appl. No.: 16/004,916

(22) Filed: Jun. 11, 2018

(65) Prior Publication Data

US 2018/0293725 A1 Oct. 11, 2018

Related U.S. Application Data

(63) Continuation of application No. PCT/JP2015/084983, filed on Dec. 14, 2015.

(51) Int. Cl.
*G06T 7/00* (2017.01)
*G01B 11/24* (2006.01)
(Continued)

(52) U.S. Cl.
CPC ............ *G06T 7/0004* (2013.01); *G01B 11/24* (2013.01); *G01B 11/30* (2013.01); *G01C 11/02* (2013.01);
(Continued)

(58) Field of Classification Search
CPC ........ G06K 9/0063; G06K 9/03; G06T 17/05; G06T 3/4038; G06T 5/006;
(Continued)

(56) References Cited

U.S. PATENT DOCUMENTS 7,298,869 B1 * 11/2007 Abernathy ............. G06V 20/13
324/330
8,873,837 B2 * 10/2014 Jahanshahi ............. G06T 7/155
382/173
(Continued)

FOREIGN PATENT DOCUMENTS

EP 2 031 558 A2 3/2009
EP 2 141 450 A1 1/2010
(Continued)

OTHER PUBLICATIONS

International Search Report issued in International Application No. PCT/JP2015/084983, by the Japan Patent Office, dated Mar. 2, 2016.

(Continued)

*Primary Examiner* — Kenny A Cese
(74) *Attorney, Agent, or Firm* — FINNEGAN, HENDERSON, FARABOW, GARRETT & DUNNER, LLP

(57) ABSTRACT

A defect detection apparatus includes a defect detection unit and a calculation unit. The defect detection unit detects a defect that appears on an external appearance of a structure through imaging processing from external appearance image data that is generated by imaging the external appearance of the structure with a surveying instrument. The calculation unit calculates defect data relating to the defect detected by the defect detection unit by using coordinate data that is correlated with the external appearance image data.

22 Claims, 24 Drawing Sheets

(51) Int. Cl.

| | |
|---|---|
| *G01B 11/30* | (2006.01) |
| *G01C 15/00* | (2006.01) |
| *G01N 21/88* | (2006.01) |
| *G03B 15/00* | (2021.01) |
| *G01C 11/02* | (2006.01) |
| *G06T 1/00* | (2006.01) |
| *H04N 23/69* | (2023.01) |
| *G06T 5/00* | (2006.01) |
| *G06T 5/50* | (2006.01) |

(52) U.S. Cl.
CPC ............ *G01C 15/00* (2013.01); *G01N 21/88* (2013.01); *G01N 21/8851* (2013.01); *G03B 15/00* (2013.01); *G06T 1/00* (2013.01); *G06T 5/006* (2013.01); *G06T 5/50* (2013.01); *H04N 23/69* (2023.01); *G01C 11/025* (2013.01)

(58) Field of Classification Search
CPC ............ G06T 2207/20221; G06T 7/60; G06T 7/0004; G06T 5/50; G06T 1/00; G01N 21/88; G01N 21/8851; G01B 11/30; G01B 11/24; G01B 11/022; G01C 15/002; G01C 15/00; G01C 11/02; G01C 11/025; G03B 37/02; G03B 17/561; G03B 15/00; H04N 23/69
See application file for complete search history.

(56) References Cited

U.S. PATENT DOCUMENTS

| | | | | |
|---|---|---|---|---|
| 9,336,552 | B1* | 5/2016 | Freeman | H04N 13/271 |
| 9,654,679 | B1* | 5/2017 | Veliche | G06T 15/205 |
| 2009/0135401 | A1* | 5/2009 | Nakaniwa | G01C 15/002 |
| | | | | 356/625 |
| 2009/0245653 | A1* | 10/2009 | Kochi | G01N 21/8851 |
| | | | | 382/284 |
| 2010/0007739 | A1 | 1/2010 | Otani et al. | |
| 2010/0030515 | A1* | 2/2010 | Kludas | G01B 11/24 |
| | | | | 702/159 |
| 2013/0044209 | A1* | 2/2013 | Hwang | G01N 21/896 |
| | | | | 348/128 |
| 2013/0216089 | A1* | 8/2013 | Chen | G06T 7/0002 |
| | | | | 382/100 |
| 2015/0022656 | A1* | 1/2015 | Carr | G06V 20/13 |
| | | | | 348/117 |
| 2015/0116481 | A1* | 4/2015 | Troy | B64F 5/60 |
| | | | | 348/128 |
| 2015/0371431 | A1* | 12/2015 | Korb | G06K 9/00208 |
| | | | | 382/113 |
| 2016/0050840 | A1* | 2/2016 | Sauder | G06K 9/00657 |
| | | | | 701/3 |

FOREIGN PATENT DOCUMENTS

| | | |
|---|---|---|
| EP | 2 602 588 A1 | 6/2013 |
| JP | 2004-145680 A | 5/2004 |
| JP | 2009-053126 A | 3/2009 |
| JP | 2010-038901 A | 2/2010 |
| JP | 2011-237713 A | 11/2011 |
| JP | 2014-021672 A | 2/2014 |

OTHER PUBLICATIONS

International Preliminary Report on Patentability issued in International Application No. PCT/JP2015/084983, by the International Bureau of WIPO, dated Jun. 19, 2018.

Extended European Search Report issued by the European Patent Office dated Jun. 6, 2019 in counterpart European Patent Application No. 15910673.1.

* cited by examiner

DEFECT DETECTION APPARATUS AND MEDIUM

BACKGROUND

The present disclosure relates to a defect detection apparatus and program that detect a defect that appears on an external appearance of a structure.

Japanese Laid-Open Patent Publication No. 2009-53126 discloses an apparatus that detects minute cracks by capturing images of the cracks on an external appearance of a concrete structure by an ultratelephoto camera provided in a surveying instrument, and by performing image analysis of the image that is captured.

In the apparatus described in Japanese Laid-Open Patent Publication No. 2009-53126, it is desired to automatically calculate the shape, the length, the width, the position, and the like of the cracks that are detected.

SUMMARY

In accordance with one aspect of the present disclosure, a defect detection apparatus that includes a defect detection unit and a calculation unit is provided. The defect detection unit detects a defect that appears on an external appearance of a structure through imaging processing from external appearance image data that is generated by imaging the external appearance of the structure with a surveying instrument. The calculation unit calculates defect data relating to the defect detected by the defect detection unit by using coordinate data that is correlated with the external appearance image data.

In accordance with another aspect of the present disclosure, a non-transitory computer-readable storage media comprising a program stored thereon is provided. The program is configured to cause, when the program is executed by circuitry, the circuitry to detect a defect that appears on an external appearance of a structure through imaging processing from external appearance image data that is generated by imaging the external appearance of the structure with a surveying instrument; and calculate defect data relating to the defect detected by the defect detection step by using coordinate data that is correlated with the external appearance image data.

DETAILED DESCRIPTION

Hereinafter, description will be given of a defect detection system that detects a defect that appears on an external appearance of a structure.

Figure 1:
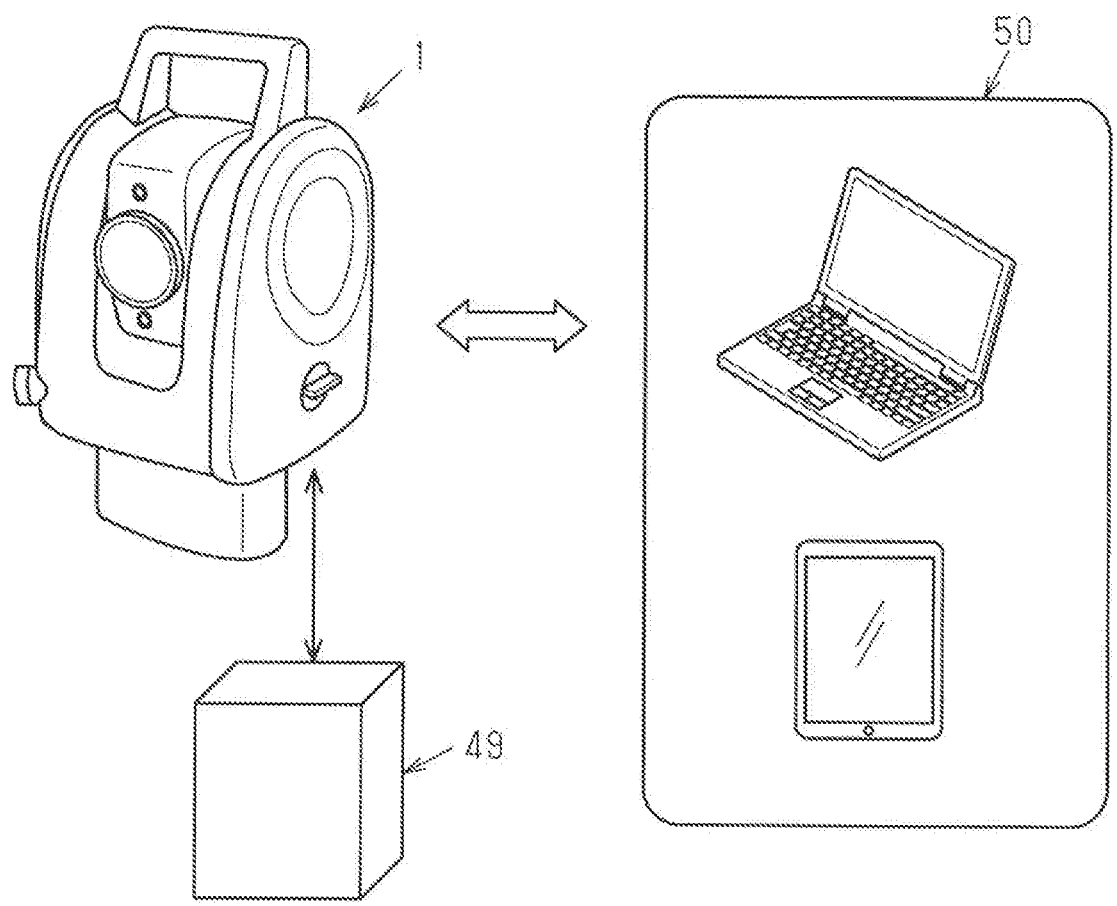
FIG. 1 is a diagram illustrating a configuration of a defect detection system.

As illustrated in FIG. 1, the defect detection system includes a surveying instrument 1 and a defect detection apparatus 50. As an example, the surveying instrument 1 is an instrument that surveys an object to be surveyed and measures an angle with the object to be surveyed and the distance from the object to be surveyed. As an example, the surveying instrument 1 is an instrument in which an electro-optical distance measuring instrument that measures a distance, and a theodolite that measures an angle are combined. As an example, the surveying instrument 1 is an instrument that simultaneously measures the angle with the object to be surveyed and the distance from the object to be surveyed. As an example, the surveying instrument 1 is a total station. As an example, the object to be surveyed is a first target that is constituted by a reflection prism such as a prism, a mirror, and a reflector sheet in a case of employing a prism type. Furthermore, the object to be surveyed may be referred to as a measuring target or a target.

As an example, the surveying instrument 1 employs a non-prism type that does not use the reflection prism such as a prism, a mirror, and a reflector sheet. In the non-prism type, the object to be surveyed is directly irradiated with distance measuring light such as a laser, and reflected light that is reflected from a measurement surface and is returned is detected to measure the distance from the measurement surface of the object to be surveyed. Examples of the object to be surveyed in the non-prism type include structures such as a bridge, a dam, a building, a tunnel, a steel frame, a road, an electric train, an airplane, a power transmission line, and an ancient tomb. In a case where driving of a vertical angle and a horizontal angle is performed by motor driving instead of the prism type, and a collimation destination can be collimated with auto focus, after the surveying instrument 1 is installed in a field, the user can perform surveying at a location spaced away from the field without entering the field. As an example, the surveying instrument 1 includes an imaging device such as a camera, and captures the image of a wall surface of a structure that is an object to be surveyed. As an example, the image of the measurement surface is an external appearance image of the structure. The surveying instrument 1 outputs position data of the captured image of the measurement surface and the captured external appearance image data.

Power is supplied to the surveying instrument 1 from a power supply. Examples of the power supply includes a power supply that is embedded in the surveying instrument 1, a power supply that is detachable from the surveying instrument 1, and an external power supply 49 that supplies power to the surveying instrument 1 from the outside. Examples of the power supply include secondary batteries such as a nickel-hydrogen battery and a lithium ion battery, a commercial power supply, a power generator, and the like.

As an example, the defect detection apparatus 50 is a general-purpose information processing apparatus such as a computer and a tablet. As an example, the defect detection apparatus 50 is connected to the surveying instrument 1 in a wired manner (for example, through a connection cable) or a wireless manner. As an example, the defect detection apparatus 50 is provided at a position spaced away from the surveying instrument 1 by several meters. Software is installed in the defect detection apparatus 50. As an example, the software is a defect detection program configured to detect a defect of a structure from an image. The defect detection apparatus 50 is a control apparatus that controls the surveying instrument 1, and executes the defect detection program to control the surveying instrument 1.

When external appearance image data and position data of an observation point included in the external appearance image data are input to the defect detection apparatus 50 from the surveying instrument 1, the defect detection apparatus 50 detects a defect that appears on the external appearance of a structure from the external appearance image data. As an example, the defect is a crack or a concavity which appears on the external appearance of the structure due to deterioration. The defect detection apparatus 50 detects the defect of the structure from the external appearance image data, and calculates defect data relating to the defect with reference to the position data. The defect data include data indicating the position of the defect. As an example, the position data and the defect data are preferably coordinate data conforming to a global coordinate system (a coordinate system not a local coordinate system, a world geodetic system, a japan geodetic system).

As an example, the defect detection apparatus 50 is a control apparatus of the surveying instrument 1. The defect detection apparatus 50 outputs an instruction for capturing the image of an external appearance of a structure to the surveying instrument 1, and controls an operation of the surveying instrument 1. As an example, the defect detection apparatus 50 rotates the surveying instrument 1 around a vertical axis and a horizontal axis to capture the image of the external appearance of the structure.

[Configuration of Surveying Instrument]

Figure 2:
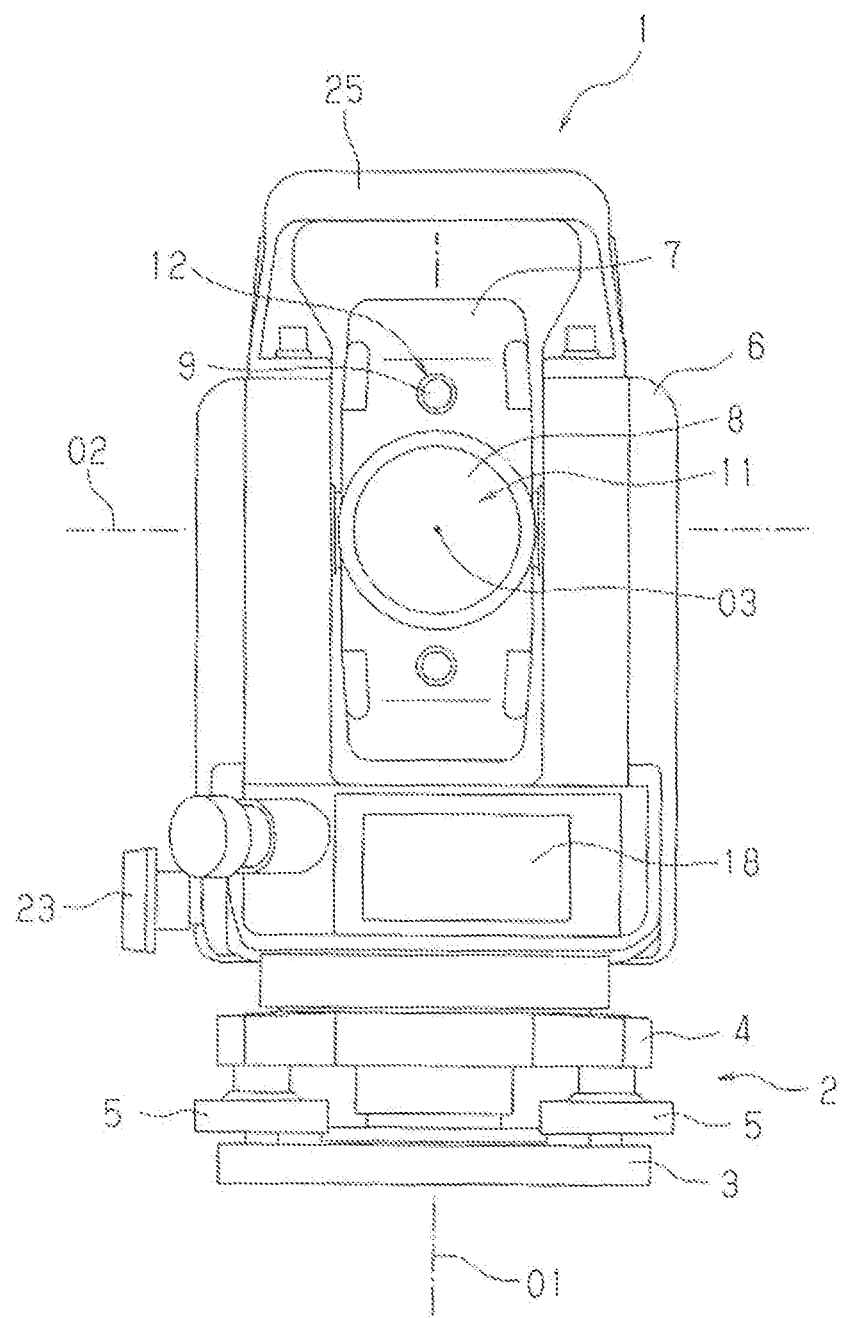
FIG. 2 is a front view of a surveying instrument.

As illustrated in FIG. 2, the surveying instrument 1 includes a leveling portion 2, a main body 6, and an imaging unit 7. For example, the leveling portion 2 is a leveling stage. The leveling portion 2 includes a bottom plate 3, an upper plate 4, and a leveling screw 5. The bottom plate 3 is a member that is fixed by three legs. For example, the bottom plate 3 is fixed to leg heads of the three legs with a screw and the like. The upper plate 4 is configured such that an inclination with respect to the bottom plate 3 can be changed by using the leveling screw 5. The main body 6 is formed on the upper plate 4. The inclination of a vertical axis O1, which is a first axis of the surveying instrument 1, can be changed by using the leveling screw 5.

A leveling process is performed to make the vertical axis of the surveying instrument 1 be vertical. The surveying instrument 1 that is leveled is in a state in which the vertical axis O1 conforms to a vertical direction. The surveying instrument 1 that is leveled is in a state in which the vertical axis O1 conforms to the vertical direction, and a horizontal axis O2 that is a second axis of the surveying instrument 1 makes a right angle with the vertical axis O1. The leveling process may be referred to as "leveling".

A centripetal process is performed to make the vertical center of the surveying instrument 1 and the center of a second target (measuring target) match each other. The centripetal process is performed to make the mechanical center of the surveying instrument 1 be located on a vertical line of a measurement point such as a surveying reference position (reference point) on the ground. The centripetal process may be referred to as "centering". The surveying instrument 1 that is centered is in a state in which the vertical axis O1 passes through the center of the second target. For example, the second target is a machine height measuring target or a surveying rivet.

Figure 3:
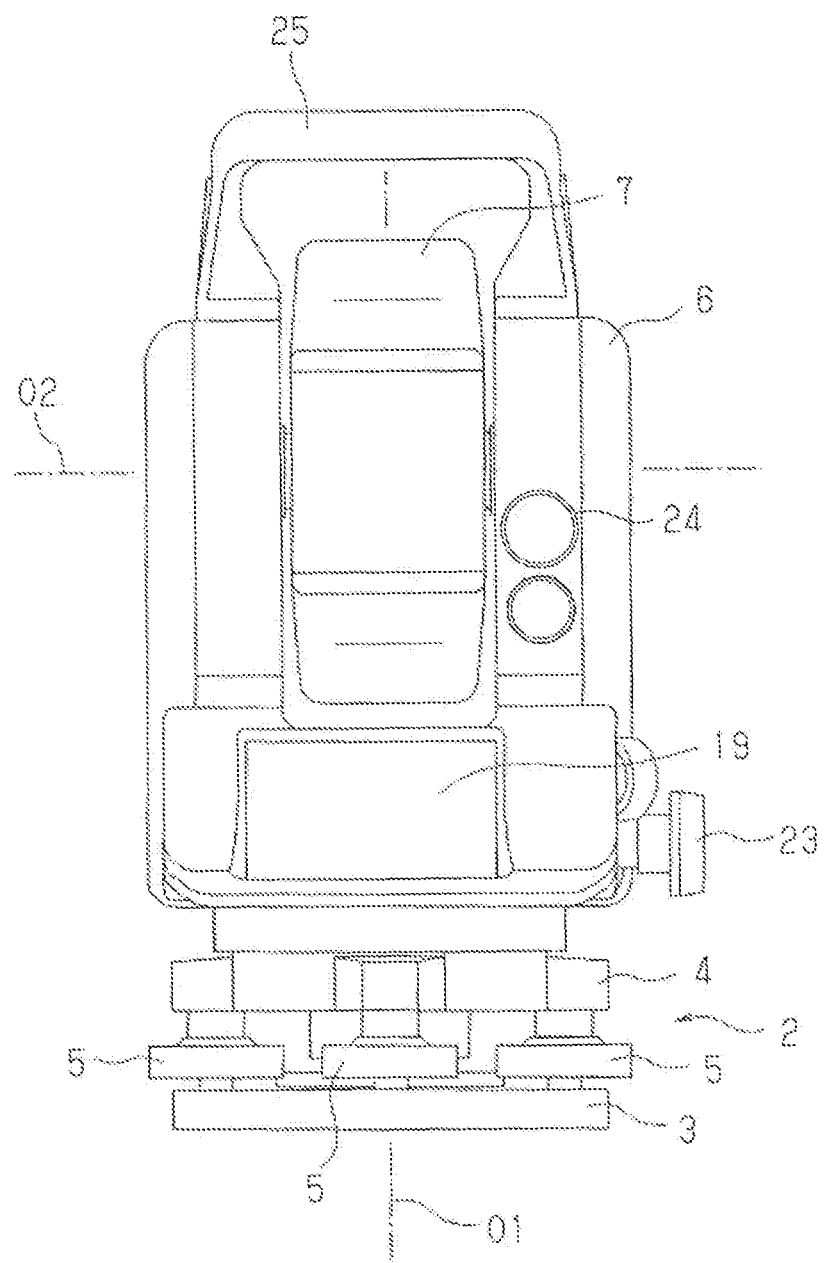
FIG. 3 is a rear view of the surveying instrument.

As illustrated in FIG. 2 and FIG. 3, the main body 6 is supported to rotate around the vertical axis by the leveling portion 2. The main body 6 is configured to rotate around the vertical axis with respect to the leveling portion 2. The main body 6 is located on an upper side of the leveling portion 2. The main body 6 supports the imaging unit 7 to rotate around the horizontal axis. The main body 6 is a support part. The main body 6 is a bracket part. The main body 6 includes a first display unit 18, a second display unit 19, a horizontal angle operation unit 23, a vertical angle operation unit 24, a gripping unit 25, and a third imaging unit 14 (refer to FIG. 4).

The first display unit 18 and the second display unit 19 have a display function of displaying the image or an object. As an example, the first display unit 18 and the second display unit 19 display an image based on image data that is generated by the imaging unit 7 or information based on observation data on a display surface of each of the display units. As an example, the first display unit 18 and the second display unit 19 are liquid crystal displays, or organic EL displays. As an example, the first display unit 18 is disposed on a reverse side. As an example, the first display unit 18 is used in a case of performing reverse observation. The second display unit 19 is disposed on a normal side. As an example, the second display unit 19 is used in a case of performing normal observation. As an example, the first display unit 18 and the second display unit 19 have a function as an operation unit that receives an operation by the user. In this case, the first display unit 18 and the second display unit 19 are constituted by an electrostatic capacitance type touch panel, a pressure sensitive touch panel, and the like. As an example, the first display unit 18 can rotate around the horizontal axis or the vertical axis. As an example, the second display unit 19 can rotate around the horizontal axis or the vertical axis. As an example, in the second display unit 19, an inclination in the vertical direction can be changed.

The horizontal angle operation unit 23 is a member that is operated by the user to rotate the main body 6 in the horizontal direction. When the horizontal angle operation unit 23 is operated by the user, the main body 6 and the imaging unit 7 rotate in combination in the horizontal direction. The vertical angle operation unit 24 is a member that is operated by the user to rotate the imaging unit 7 in the vertical direction. For example, the horizontal angle operation unit 23 and the vertical angle operation unit 24 are knobs. For example, the gripping unit 25 is a member that is gripped by the user when conveying the surveying instrument 1. For example, the gripping unit 25 is a carrying handle. For example, the gripping unit 25 is fixed to the upper surface of the main body 6.

Figure 4:
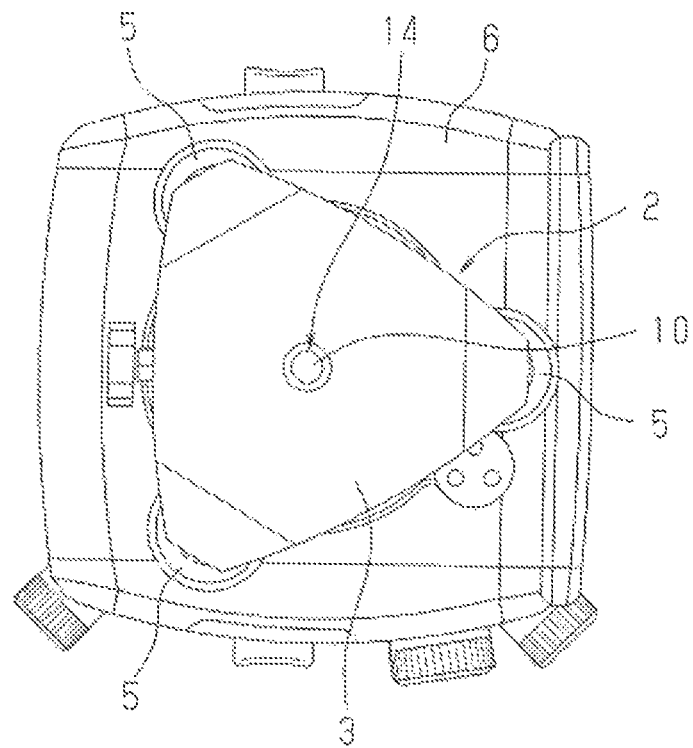
FIG. 4 is a bottom view of the surveying instrument.

As illustrated in FIG. 4, the third imaging unit 14 includes a third optical system including a third objective lens 10 and a third imaging element. The third optical system guides light from the second target to the third imaging element. The third imaging element captures the image of the second target and generates image data. The third imaging unit 14 captures the image of the lower side of the surveying instrument 1 and generates image data. The third imaging unit 14 captures the image of the lower side including the vertical axis O1 and generates image data. As an example, the third imaging element is constituted by a CCD or a CMOS. Image data generated by the third imaging unit 14 is output to an image processing unit 33. As an example, in a case where the user levels or centers the surveying instrument 1, the third imaging unit 14 generates image data for displaying the image on the lower side of the surveying instrument 1 on the first display unit 18 or the second display unit 19. The third imaging unit 14 is fixed to the main body 6. As an example, the third imaging unit 14 is a centripetal camera. As an example, the third imaging unit 14 is a centripetal telescope.

The imaging unit 7 is supported to rotate around the horizontal axis by the main body 6. The imaging unit 7 is configured to rotate around the horizontal axis O2. The imaging unit 7 is configured to rotate around the vertical axis O1 with respect to the leveling portion 2. The imaging unit 7 can rotate around the vertical axis O1, and can rotate around the horizontal axis O2. The imaging unit 7 rotates in the horizontal direction in accordance with the amount of operation of the horizontal angle operation unit 23 operated by the user. The imaging unit 7 rotates in the vertical direction in accordance with the amount of operation of the vertical angle operation unit 24 operated by the user.

The imaging unit 7 includes a first imaging unit 11 and a second imaging unit 12. The first imaging unit 11 and the second imaging unit 12 are also constituted by a CCD or a CMOS. Image data generated by the first imaging unit 11 and the second imaging unit 12 are output to the image processing unit 33. As an example, in a case of performing collimation, the first imaging unit 11 and the second imaging unit 12 generate image data for displaying the image of a visual field including the first target on the first display unit 18 or the second display unit 19. As an example, in a case of the prism type, the first imaging unit 11 and the second imaging unit 12 captures the image of the first target that is the object to be surveyed. As an example, in a case of the non-prism type, the first imaging unit 11 and the second imaging unit 12 measure a measurement surface that constitutes an external appearance of a structure. Imaging visual fields of the first imaging unit 11 and the second imaging unit 12 are different from an imaging visual field of the third imaging unit 14 and do not overlap the imaging visual field of the third imaging unit 14.

The first imaging unit 11 includes a first optical system including a first objective lens 8, and a first imaging element. The first optical system guides light in an imaging visual field (for example, including light from the first target) to the first imaging element. As an example, the first imaging unit 11 is a telescopic camera. As an example, the first imaging unit 11 is a collimation camera. As an example, the first imaging unit 11 is a collimation telescope. As an example, the first imaging unit 11 is a telescopic camera. As an example, the first imaging unit 11 has a first angle of view. As an example, the first imaging unit 11 has a first visual field.

The second imaging unit 12 includes a second optical system including a second objective lens 9, and a second imaging element. The second optical system guides light in an imaging visual field (for example, including light from the first target) to the second imaging element. The second objective lens 9 is provided separately from the first objective lens 8. As an example, the second objective lens 9 is disposed on the same plane on which the first objective lens 8 is disposed in the imaging unit 7. As an example, the second objective lens 9 is disposed in parallel to the first objective lens 8 in the vertical direction. As an example, the optical axis of the second objective lens 9 is parallel to the optical axis of the first objective lens 8. An angle of view of the second imaging unit 12 is set to a second angle of view that is wider than the first angle of view of the first imaging unit 11. The first angle of view of the first imaging unit 11 is narrower than the second angle of view of the second imaging unit 12. A second visual field angle of the second imaging unit 12 is wider than a first visual field angle of the first imaging unit 11. The first visual field angle of the first imaging unit 11 is narrower than the second visual field angle of the second imaging unit 12. As an example, when performing collimation, the second imaging unit 12 generates image data for displaying the image of the second visual field that includes the first target and is wider than the first visual field on the first display unit 18 or the second display unit 19. As an example, the second imaging unit 12 is a wide-angle camera. As an example, the second imaging unit 12 is a wide-angle telescope.

In the collimation, the objective lens is allowed to face a target, and a collimation axis is made to match the center of the target. The collimation axis is an axis that passes through the optical center of the objective lens and vertically intersects the horizontal axis. The collimation axis is an axis that passes through the optical center of the first objective lens 8 of the first imaging unit 11, and vertically intersects the horizontal axis O2. The collimation axis is an axis that passes through the center of an objective lens of the theodolite and is perpendicular to the horizontal axis. The collimation axis matches the optical axis of the first objective lens 8. The surveying instrument 1 that is collimated is in a state in which the first objective lens 8 faces the first target, and a collimation axis O3 that is a third axis of the surveying instrument 1 matches the center of the first target. In the collimation axis, a direction toward the outside of the surveying instrument 1 from the inside of the surveying instrument 1 may be referred to as "collimation direction".

[System Configuration of Surveying Instrument]

Figure 5:
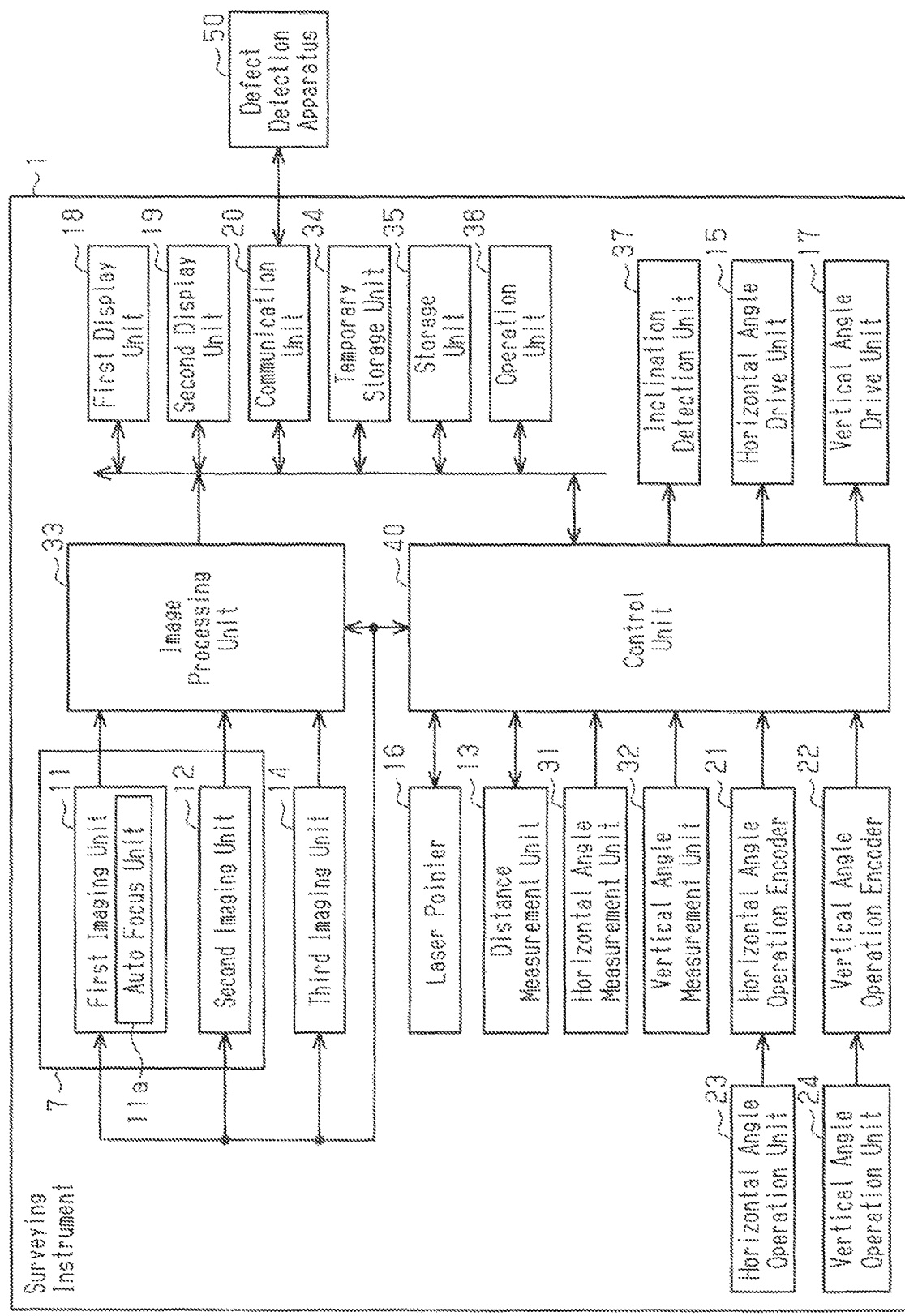
FIG. 5 is a block diagram illustrating a system configuration of the surveying instrument.

FIG. 5 is a block diagram illustrating a system configuration of the surveying instrument 1.

The surveying instrument 1 includes the imaging unit 7 including the first imaging unit 11 and the second imaging unit 12, and the third imaging unit 14. The surveying instrument 1 includes a distance measurement unit 13, a horizontal angle drive unit 15, a laser pointer 16, a vertical angle drive unit 17, the first display unit 18, the second display unit 19, a communication unit 20, a horizontal angle operation encoder 21, a vertical angle operation encoder 22, a horizontal angle operation unit 23, a vertical angle operation unit 24, a horizontal angle measurement unit 31, a vertical angle measurement unit 32, the image processing unit 33, a temporary storage unit 34, a storage unit 35, an operation unit 36, a control unit 40, and an inclination detection unit 37.

The first imaging unit 11 and the second imaging unit 12 outputs image data, which is generated by capturing an image on the basis of imaging conditions (a gain, accumulated time (a shutter speed), and the like) set by the control unit 40, to the image processing unit 33. Adequate exposure of the first imaging unit 11 and the second imaging unit 12 is automatically set by the control unit 40 such that brightness of an image based on the image data that is generated by capturing an image is adequate. In the first imaging unit 11 and the second imaging unit 12, an automatic exposure function is executed by the control unit 40. The first optical system in the first imaging unit 11 has a configuration in which a focus lens drive unit can change the position of a focus lens along the optical axis direction in response to a focus adjustment instruction that is given by the control unit 40. The third imaging unit 14 outputs third image data, which is generated by capturing an image on the basis of imaging conditions (a gain, accumulated time (a shutter speed), and the like) set by the control unit 40, to the image processing unit 33. The first imaging unit 11 includes an auto focus unit 11a.

The image processing unit 33 performs image processing on image data output from the first imaging unit 11, the second imaging unit 12, and the third imaging unit 14. The image data subjected to the image processing by the image processing unit 33 is stored in the temporary storage unit 34. For example, in a live-view operation, in a case where the first imaging unit 11, the second imaging unit 12, or the third imaging unit 14 continuously captures images, a plurality of sequentially output pieces of image data are sequentially stored in the temporary storage unit 34.

The temporary storage unit 34 temporarily stores image data. As an example, the temporary storage unit 34 is a volatile memory. As an example, the temporary storage unit 34 is a random access memory (RAM).

Examples of the image processing that is performed by the image processing unit 33 include processing of generating image data for display, processing of generating compressed image data, processing of generating image data for recording, processing of electronically enlarging an image by cutting out a part of the image based on the image date (digital zoom), and the like. The image data for display that is generated by the image processing unit 33 is displayed on the first display unit 18 or the second display unit 19 under a control of the control unit 40.

Furthermore, the surveying instrument 1 may include a collimation ocular optical system or a centripetal ocular optical system, or does not necessary need to include such optical systems.

The image data for recording which is generated by the image processing unit 33 is recorded in an external memory through the communication unit 20. As an example, the external memory is a non-volatile memory. As an example, the external memory is a flash memory, a hard disk, or an optical disc.

The distance measurement unit 13 is a surveying unit, and is constituted by an electro-optical distance measuring instrument including a light-emitting element, a dichroic mirror, and a light-receiving element as an example. As an example, the light-emitting element is a laser diode such as a pulse laser diode (PLD), or a light-emitting diode such as an infrared-emitting diode. As an example, the distance measurement unit 13 transmits distance measuring light, which is emitted from the light-emitting element, toward the first target (for example, a measurement surface that constitutes an external appearance of a reflection prism or a structure) that is an object to be surveyed as a light beam concentric with the first objective lens 8 by the dichroic mirror. Light reflected from the object to be surveyed returns again to the first objective lens 8, is separated from the distance measuring light in the dichroic prism, and is incident to the light-receiving element. The distance from the object to be surveyed is calculated from a time difference between reference light that is incident to the light-receiving element in the distance measurement unit 13 from the light-emitting element, and the distance measuring light from the object to be surveyed. On the other hand, the distance measurement unit 13 may employ a phase-difference distance measuring method in which the distance from the object to be surveyed is calculated on the basis of a phase difference.

The laser pointer 16 irradiates the first target with light that is transmitted to the first target. As an example, the laser pointer 16 is the light-emitting diode of the distance measurement unit 13. As an example, the laser pointer 16 and the distance measurement unit 13 commonly use the same light-emitting diode. The laser pointer 16 transmits a light beam concentric with the first objective lens 8 toward the first target. As an example, the laser pointer 16 is a light-emitting diode that is provided separately from the distance measurement unit 13.

The horizontal angle measurement unit 31 detects a rotation angle of the collimation axis O3 (angle around the vertical axis O1) in a horizontal direction. The horizontal angle measurement unit 31 outputs a signal corresponding to the rotation angle that is detected to the control unit 40. As an example, the horizontal angle measurement unit 31 is constituted by an encoder. As an example, the horizontal angle measurement unit 31 is constituted by an optical absolute type rotary encoder. The horizontal angle measurement unit 31 is an angle detection unit that detects a horizontal angle.

The vertical angle measurement unit 32 detects a rotation angle (angle around the horizontal axis O2) of the collimation axis O3 in a vertical direction (upper and lower direction). The vertical angle measurement unit 32 outputs a detection signal corresponding to the angle that is detected to the control unit 40. As an example, the vertical angle measurement unit 32 is constituted by an encoder. As an example, the vertical angle measurement unit 32 is constituted by an optical absolute type rotary encoder. The vertical angle measurement unit 32 is an angle detection unit that detects a vertical angle.

The horizontal angle operation encoder 21 detects a rotation angle of the horizontal angle operation unit 23. The horizontal angle operation encoder 21 outputs a signal corresponding to the rotation angle that is detected to the control unit 40.

The horizontal angle drive unit 15 rotates the main body 6 around the vertical axis O1 with respect to the leveling portion 2. When the horizontal angle drive unit 15 rotates the main body 6 around the vertical axis O1 with respect to the leveling portion 2, the imaging unit 7 rotates around the vertical axis O1 with respect to the leveling portion 2. As an example, the horizontal angle drive unit 15 is constituted by a motor.

As an example, the horizontal angle drive unit 15 rotates the main body 6 around the vertical axis O1 with respect to the leveling portion 2 in accordance with the amount of drive that is calculated by the control unit 40 on the basis of a user-touch-position of a touch panel of the first display unit 18 or the second display unit 19.

As an example, when receiving a rotation instruction from an external apparatus such as the defect detection apparatus 50 and a remote operation apparatus, the horizontal angle drive unit 15 rotates the main body 6 around the vertical axis O1 with respect to the leveling portion 2 in accordance with the amount of drive which is calculated by the control unit 40 on the basis of the rotation instruction received from the external apparatus.

As an example, in a case where the horizontal angle operation unit 23 is operated, the horizontal angle drive unit 15 rotates the main body 6 around the vertical axis O1 of the surveying instrument 1 with respect to the leveling portion 2.

The vertical angle operation encoder 22 detects a rotation angle of the vertical angle operation unit 24. The vertical angle operation encoder 22 outputs a signal corresponding to the rotation angle that is detected to the control unit 40.

The vertical angle drive unit 17 rotates the imaging unit 7 around the horizontal axis O2 with respect to the main body 6. For example, the vertical angle drive unit 17 is constituted by a motor.

As an example, the vertical angle drive unit 17 rotates the imaging unit 7 around the horizontal axis O2 with respect to the main body 6 in accordance with the amount of drive which is calculated by the control unit 40 on the basis of a user-touch-position of the touch panel of the first display unit 18 or the second display unit 19.

As an example, when receiving a rotation instruction from an external apparatus, the vertical angle drive unit 17 rotates the imaging unit 7 around the horizontal axis O2 with respect to the main body 6 in accordance with the amount of drive which is calculated by the control unit 40 on the basis of the rotation instruction that is received from the external apparatus.

As an example, in a case where the vertical angle operation unit 24 is operated, the vertical angle drive unit 17 rotates the imaging unit 7 around the horizontal axis O2 with respect to the main body 6.

The communication unit 20 performs communication with the defect detection apparatus 50, which is an external apparatus. The communication unit 20 is an interface that performs data input and output with the external apparatus. Examples of the communication unit 20 include an ActiveSync standard communication interface, a universal serial bus (USB) standard communication interface, a Bluetooth (registered trademark) standard radio communication interface, and an RS-232C serial communication standard communication interface. The communication unit 20 transmits image data captured by the surveying instrument 1 or position data to the defect detection apparatus 50, and receives an instruction signal that is used to control the surveying instrument 1 and is transmitted from the defect detection apparatus 50.

The storage unit 35 stores programs and parameters that are necessary for an operation of the surveying instrument 1, design data that is the base of construction, and the like. The storage unit 35 stores the programs, the parameters, and the design data in a manner of not being lost even when the surveying instrument 1 does not operate. As an example, the storage unit 35 is a non-volatile memory or a hard disk. As an example, the storage unit 35 is a read only memory (ROM). As an example, the storage unit 35 stores measurement surface image data captured by the surveying instrument 1. As an example, the storage unit 35 stores map data that is created in a global coordinate system. As an example, the storage unit 35 stores a defect detection program. The defect detection program can be executed by the surveying instrument 1. The storage unit 35 stores an inclination state (inclination data), which is detected by the inclination detection unit 37, of the vertical axis of the surveying instrument 1. The inclination data stored in the storage unit 35 is transmitted, for example, to the defect detection apparatus 50, and is used when the defect detection apparatus 50 performs orthorectification processing on image data that is generated through imaging with the surveying instrument 1. The defect detection apparatus 50 performs the orthorectification processing on the basis of the inclination state of the vertical axis of the surveying instrument 1 on the image data generated through imaging with the surveying instrument 1.

As an example, the operation unit 36 is a mechanical operation member such as a push button, a volume switch, and a slide switch that are disposed in a housing. As an example, the operation unit 36 is a touch panel that is disposed on a display surface of the display unit of the first display unit 18 or the second display unit 19. When being operated by the user, the mechanical operation member outputs an instruction signal for execution of a function correlated with each operation member to the control unit 40. In addition, when an object that is displayed is touched, the touch panel outputs an instruction signal for execution of a function that is defined to the object to the control unit 40.

The control unit 40 controls the entirety of operations of the surveying instrument 1.

As an example, the control unit 40 rotates the main body 6 around the vertical axis O1 with respect to the leveling portion 2 in accordance with an instruction signal from the operation unit 36 or an external apparatus. As an example, the control unit 40 rotates the imaging unit 7 around the horizontal axis O2 with respect to the main body 6 in accordance with an instruction from the operation unit 36 or an external apparatus. As an example, the control unit 40 rotates the imaging unit 7 around the horizontal axis O2 with respect to the main body 6 in accordance with a situation in which the horizontal angle operation unit 23 is operated by the user.

As an example, the control unit 40 operates the first imaging unit 11 and the second imaging unit 12 to capture the image of the measurement surface that constitutes the external appearance of the reflection prism that is the first target or the structure on the basis of set imaging conditions, and outputs image data generated through the imaging to the image processing unit 33.

As an example, when a drive instruction signal is input from the defect detection apparatus 50, the control unit 40 drives the first imaging unit 11 (including the auto focus unit 11a), the second imaging unit 12, the third imaging unit 14, the imaging unit 7, the horizontal angle drive unit 15, the vertical angle drive unit 17, and the like in accordance with the instruction signal.

As an example, the control unit 40 outputs image data that is generated by the imaging unit 7 or observation data to the defect detection apparatus 50 from the communication unit 20.

[System Configuration of Defect Detection Apparatus]

Figure 6:
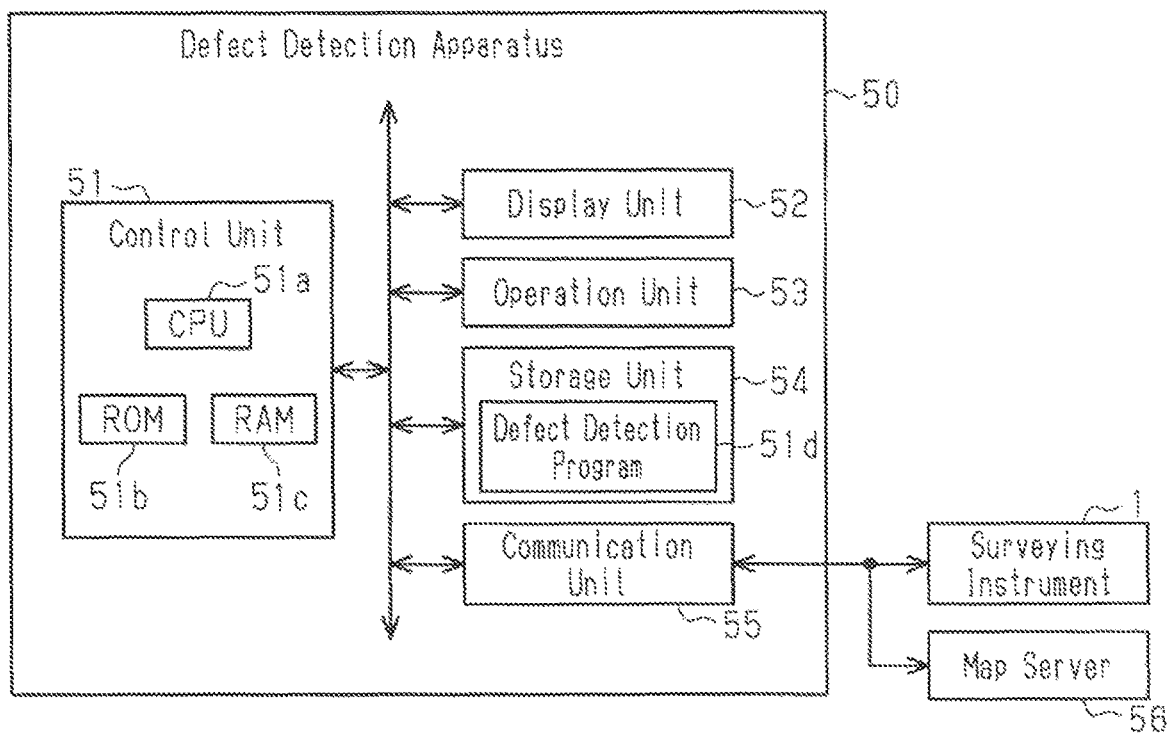
FIG. 6 is a block diagram of a defect detection apparatus.

FIG. 6 is a block diagram illustrating a system configuration of the defect detection apparatus 50.

The defect detection apparatus 50 includes a control unit 51, a display unit 52, an operation unit 53, a storage unit 54, and a communication unit 55.

The control unit 51 has the same configuration as that of a computer. In the control unit 51, a CPU 51a, a ROM 51b, and a RAM 51c are connected to each other through a bus. As an example, the control unit 51 executes a defect detection program 51d that is installed in a hard disk or the like that constitutes the storage unit 54. As an example, the control unit 51 functions as a display control unit that displays an image and the like on the display unit 52. The control unit 51 displays an image based on image data generated by the imaging unit 7, or information based on observation data on the display unit 52. As an example, the control unit 51 displays an image of a measurement surface that constitutes an external appearance of a structure on the display unit 52. As an example, the control unit 51 functions as a defect detection unit that detects a defect, which is included in the external appearance image data, of the structure. The control unit 51 functions as a calculation unit that calculates defect data relating to the defect detected by the defect detection unit by using coordinate data that is correlated with the external appearance image data. As an example, the control unit 51 outputs an instruction signal for driving the first imaging unit 11, the second imaging unit 12, the third imaging unit 14, the imaging unit 7, the horizontal angle drive unit 15, the vertical angle drive unit 17, and the like to the surveying instrument 1 through the communication unit 55.

The display unit 52 has a display function of displaying an image or an object. As an example, the display unit 52 is a liquid crystal display, an organic EL display, or a CRT. As an example, the display unit 52 displays an image based on image data generated by the first imaging unit 11 or the second imaging unit 12, or information based on observation data on a display surface of the display unit.

As an example, the operation unit 53 is a keyboard, a mouse, or a touch panel that is disposed on the display surface of the display unit 52. The operation unit 53 selects an object displayed on the display unit 52 and outputs an instruction for execution of a function defined to the object to the control unit 51.

The storage unit 54 stores programs, parameters, and the like in a manner of not being lost even when the surveying instrument 1 does not operate. As an example, the storage unit 54 is a non-volatile memory, or a hard disk. As an example, the storage unit 54 stores a defect detection program 51d, design data that is the base of construction, and the like. As an example, the storage unit 54 stores image data of a measurement surface that constitutes an external appearance of a structure. As an example, the storage unit 54 stores map data that is created in a global coordinate system. As an example, the folders are provided in the storage unit 54 in accordance with the defect detection program 51d. A plurality of pieces of external appearance image data of a measurement range that is captured in accordance with the defect detection program 51d, and the like are stored in the folders.

The communication unit 55 performs communication with the communication unit 20 of the surveying instrument 1. As an example, the communication unit 55 receives image data that is captured by the surveying instrument 1, or position data, and outputs an instruction signal for controlling the surveying instrument 1. As an example, the communication unit 55 performs communication with an external apparatus through a network such as a wide area network and a local area network. As an example, the communication unit 55 performs communication with an external server apparatus. As an example, the communication unit 55 receives map data from a map server device 56. For example, the map data is created in accordance with global coordinate system. As an example, the communication unit 55 receives design data that is the base of construction from a management server apparatus that stores the design data. As an example, the communication unit 55 receives image data of a measurement surface that constitutes an external appearance of a structure from the management server apparatus.

[Overview of Defect Detection of Structure]

Figure 7A:
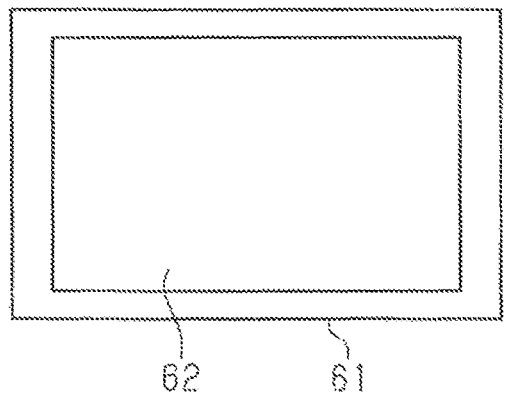
FIG. 7A is a diagram illustrating a relationship between a measurement surface and a measurement range.

FIG. 7 is a diagram illustrating an overview of defect detection of a structure, and FIG. 7A is a diagram illustrating a relationship between a measurement surface and a measurement range.

In defect detection, a measurement surface 61 is defined from observation data (distance measurement data obtained by measuring a distance with the distance measurement unit 13, horizontal angle data obtained by measuring an angle with the horizontal angle measurement unit 31, and vertical angle data obtained by measuring an angle with the vertical angle measurement unit 32) that is obtained by observing (collimating and measuring the distance of) at least arbitrary two points in the structure. When defining the measurement surface 61, an image based on image data generated through imaging with the second imaging unit 12 is displayed on the first display unit 18 or the second display unit 19, or light is transmitted from the laser pointer 16, and thus the user can grasp that the surveying instrument 1 is to survey which spot of the structure.

A measurement range 62 is set by measuring angles (measuring a horizontal angle and a vertical angle) for at least arbitrary two points in the structure. In a case of setting the measurement range 62 after defining the measurement surface 61, the setting of the measurement range 62 is possible only by measuring angles without measuring the distance of the at least arbitrary two points of a structure because the measurement surface 61 is defined. After defining the measurement surface 61, in a case of setting the measurement range 62, the setting of the measurement range 62 is possible by using the horizontal angle data obtained by measuring an angle with the horizontal angle measurement unit 31, and the vertical angle data obtained by measuring an angle with the vertical angle measurement unit 32 among the distance measurement data obtained by measuring a distance with the distance measurement unit 13, the horizontal angle data obtained by measuring an angle with the horizontal angle measurement unit 31, and the vertical angle data obtained by measuring an angle with the vertical angle measurement unit 32 for at least arbitrary two points of the structure without using the distance measurement data obtained by measuring a distance with the distance measurement unit 13.

Two points that are observed when defining the measurement surface 61 and two points at which an angle is measured when setting the measurement range 62 may be observation points different from each other, or may be the same observation points.

Figure 7B:
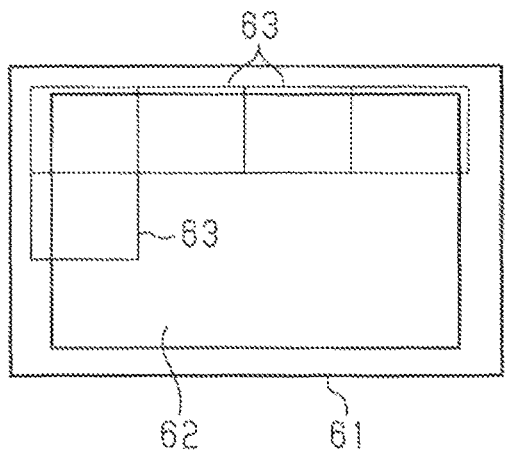
FIG. 7B is a diagram illustrating a relationship between the measurement surface, the measurement range, and an imaging range.

FIG. 7B is a diagram illustrating a relationship between the measurement surface, the measurement range, and the imaging range. To obtain external appearance image data of the entirety of the measurement range 62 that is set, the surveying instrument 1 sequentially captures an image with the first imaging unit 11, and sequentially generates external appearance image data of an imaging range 63 at a first angle of view. Since the measurement surface 61 is defined in advance, the position of an arbitrary pixel of an external appearance image based on external appearance image data that is a digital image can be identified with coordinate data through conversion of an angle from a collimated observation point during imaging. On each external appearance image data, defect detection is performed. The position of a defect that is detected is identified with coordinate data that is defect data. As an example, position data of external appearance image data, or defect data that represents a position and the like of a defect is global coordinate data. Each external appearance image data in the measurement range 62 that is imaged is subjected to orthorectification processing, and is subsequently subjected to a stitching processing unit. The resultant data is stored in the storage unit 54 and the like.

Figure 8:
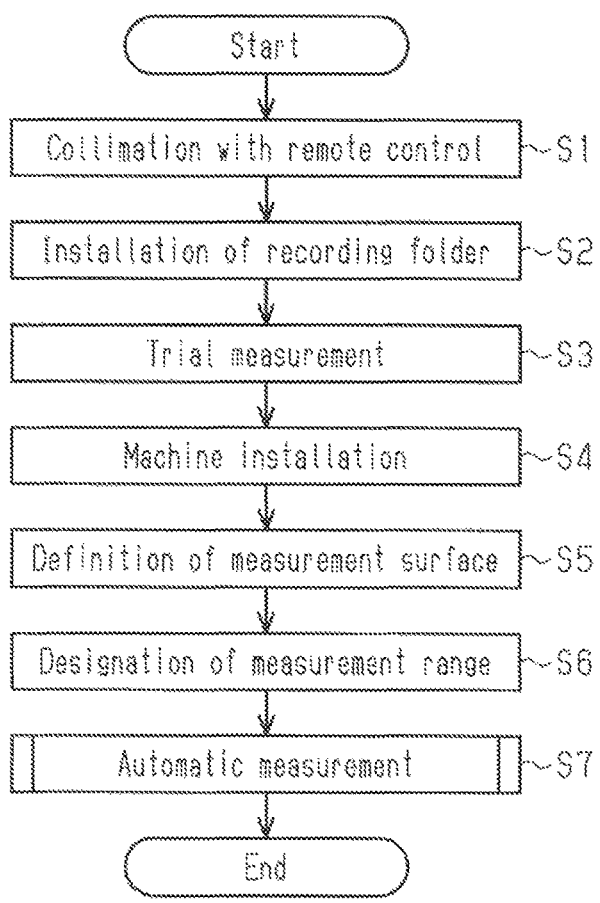
FIG. 8 is a flowchart illustrating a defect detection sequence in a structure.

FIG. 8 is a flowchart illustrating a defect detection sequence in a structure.

In step S1, the control unit 51 of the defect detection apparatus 50 initiates a remote control of the surveying instrument 1, and the surveying instrument 1 collimates the measurement surface 61 and the like of the structure. As an example, the control unit 51 can perform switching of an angle of view of the first imaging unit 11 and the second imaging unit 12, imaging, distance measurement, auto focus, manual exposure, white balance, on/off switching of the laser pointer 16, and the like through the control unit 40 of the surveying instrument 1. As an example, the control unit 51 displays an angle measurement value and a leveling state on the display unit 52.

In step S2, the control unit 51 creates recording folders which store external appearance image data in the storage unit 54.

In step S3, the surveying instrument 1 performs trial measurement in accordance with the control of the control unit 51. As an example, in the trial measurement, imaging with the first imaging unit 11 or the second imaging unit 12 of the surveying instrument 1 is performed to include a defect that appears on the external appearance of the structure that is desired to detect a defect by the user. As an example, the defect is detected by subjecting the external appearance image data generated through imaging with the first imaging unit 11 or the second imaging unit 12 to image analysis with the defect detection apparatus 50, and by measuring a contrast. The control unit 51 displays an external appearance image based on the external appearance image data generated through imaging with the first imaging unit 11 or the second imaging unit 12 on the display unit 52. The user views the external appearance image displayed on the display unit 52 and operates the operation unit 53, the control unit 51 adjusts sensitivity, exposure, and the like of the first imaging unit 11 through the control unit 40, and performs setting of the first imaging unit 11 in such a manner that a defect can be detected in the external appearance image. As an example, the trial measurement is performed at a plurality of sites. As an example, the surveying instrument 1 is installed at a site with good measurement environment which is found from the result of the trial measurement.

Figure 9:
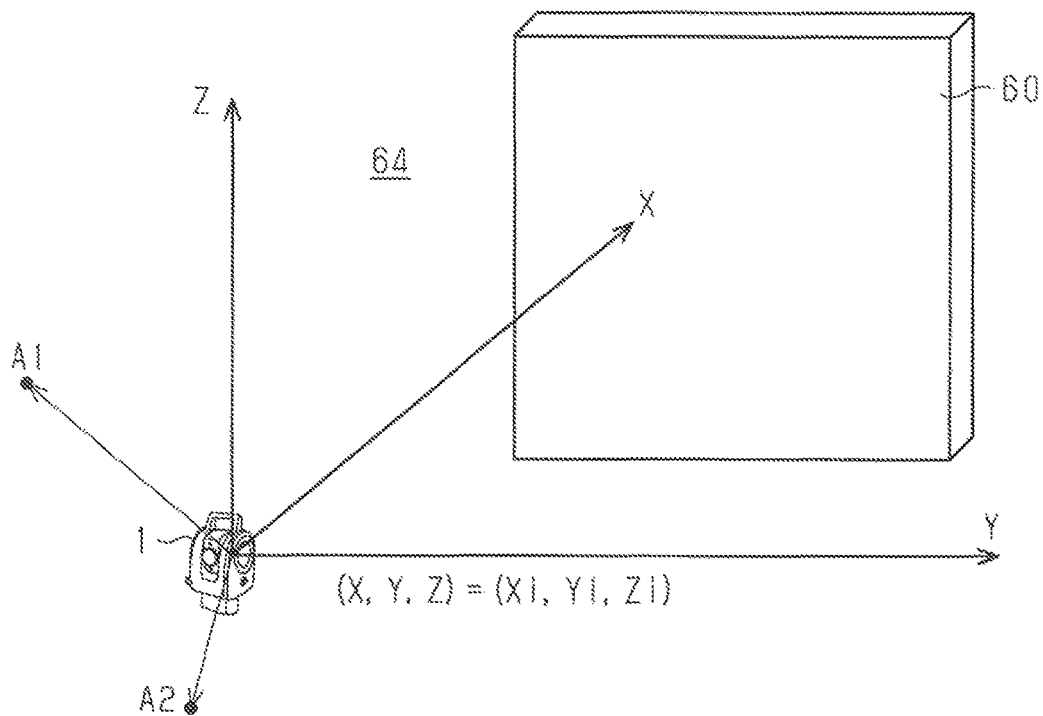
FIG. 9 is a diagram illustrating machine installation.

In step S4, machine installation of the surveying instrument 1 is performed. FIG. 9 is a diagram illustrating machine installation. As an example, in the machine installation, leveling and centering of the surveying instrument 1 are performed by capturing the image of the second target with the third imaging unit 14. As an example, the surveying instrument 1 performs angle measurement and distance measurement for each of two points A1 (X1, Y1, Z1) and A2 (X2, Y2, Z2) that are already known in accordance with the control of the control unit 51. As illustrated in FIG. 9, through the machine installation, the surveying instrument 1 is installed on global coordinates 64 by calculating coordinate values ((X, Y, Z)=(Xi, Yi, Zi)) indicating the position of the surveying instrument 1 on the global coordinates 64.

As an example, the trial measurement is performed prior to the machine installation. As an example, the trial measurement is performed after the machine installation. As an example, the sequence of the trial measurement and the machine installation is set by the user by using the defect detection apparatus 50. In a case where the user sets the sequence of the trial measurement and the machine installation, as an example, an object for selection of the trial measurement and the machine installation is displayed on the display unit 52, and is selected with the operation unit 53. The machine installation is time-consuming working, and thus it is preferable to perform the machine installation after the trial measurement.

In step S5, the surveying instrument 1 defines the measurement surface 61 on the basis of a control of the control unit 51. As an example, the surveying instrument 1 performs angle measurement and distance measurement for at least arbitrary two points of the external appearance (for example, a wall surface) of the structure, and defines a surface including the arbitrary two points as the measurement surface 61. The surveying instrument 1 identifies the position of the surveying instrument 1 in the global coordinates 64 through the machine installation, and defines the measurement surface 61, and thus the surveying instrument 1 can identify any observation point of the measurement surface 61 with the global coordinates.

Figure 10:
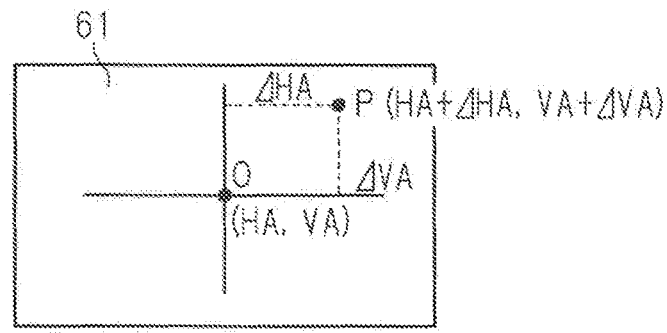
FIG. 10 is a diagram illustrating coordinate data of an arbitrary pixel on a digital image.

FIG. 10 is a diagram illustrating position data of an arbitrary pixel on a digital image that can be identified by the definition of the measurement surface 61.

As described above, since the measurement surface 61 is defined, at an arbitrary pixel (P) in an imaging range 63 captured by the surveying instrument 1, the surveying instrument 1 can calculate angles (HA and VA) at an observation point O indicated by the center of a reticle having a cross shape, and can convert angles from the observation point O of the pixel (P) into global coordinate data. According to this, the position of each pixel in the external appearance image data can be identified with the global coordinate data that is position data as in a case of performing angle measurement for the pixel. As an example, in a case where a first imaging element of the first imaging unit 11 includes 1920 pixels×1080 pixels, the position of a digital image can be identified with accuracy corresponding to the number of pixels provided in the first imaging element.

Furthermore, details relating to a method of defining the measurement surface 61 will be described later.

In step S6, the surveying instrument 1 designates the measurement range 62, for which defect detection of the structure is performed, within the measurement surface 61 defined based on the control of the control unit 51.

Furthermore, details relating to the definition of the measurement range 62 will be described later.

In step S7, in accordance with the control of the control unit 51, the surveying instrument 1 drives the horizontal angle drive unit 15 to rotate the imaging unit 7 around the vertical axis O1, and drives the vertical angle drive unit 17 to rotate the imaging unit 7 around the horizontal axis O2. The surveying instrument 1 performs automatic measurement of the measurement range 62 in accordance with the control of the control unit 51. The surveying instrument 1 sequentially captures the image of the measurement range 62 with the first imaging unit 11 while changing the collimation direction at each performance of imaging. External appearance image data that is sequentially captured is input to the defect detection apparatus 50 in combination with the position data. The control unit 51 performs defect detection on the external appearance image data input from the surveying instrument 1.

Furthermore, details relating to the automatic measurement of the first imaging unit 11 will be described later.

[Definition of Measurement Surface (Step S5)]

For example, a flat surface and a curved surface exist in an external appearance of a structure that is an object to be measured. As an example, the kind of the flat surface includes a vertical surface, a horizontal surface, and an inclined surface. As an example, the kind of the curved surface includes a curved surface in which design data exists, a curved surface on a circular column or an elliptical column, and other free-form surfaces.

Figure 11:
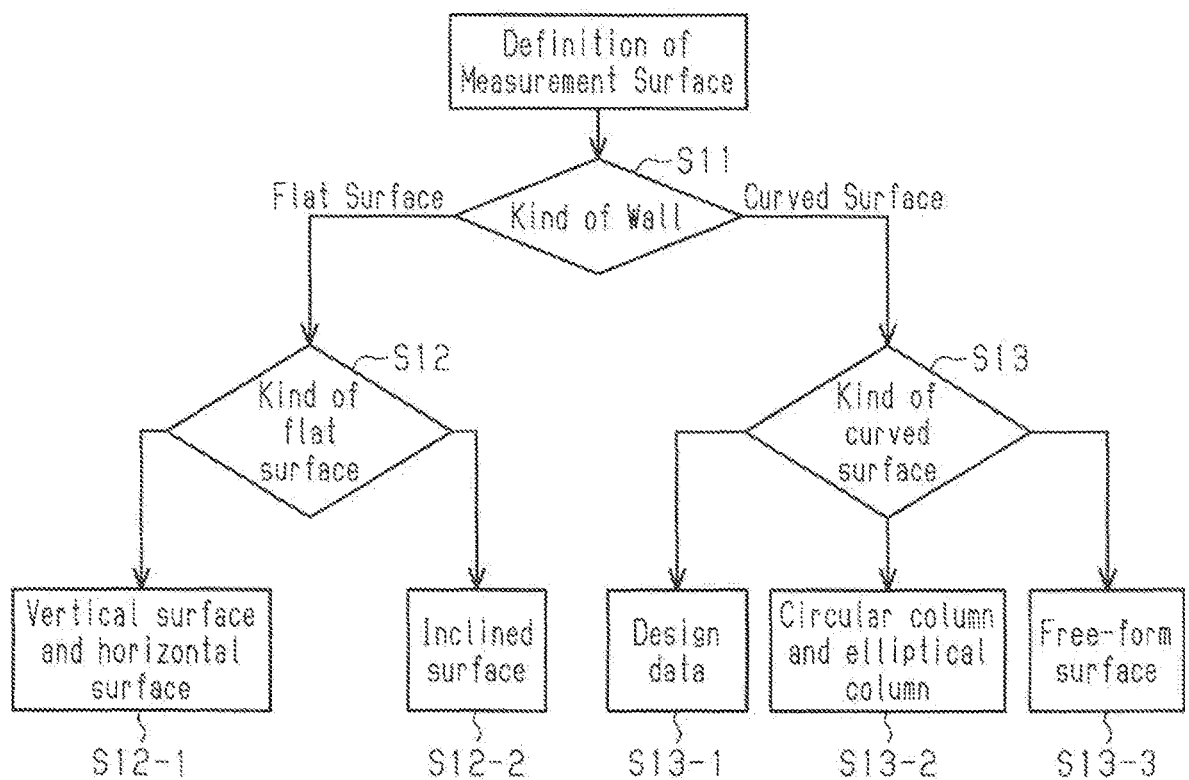
FIG. 11 is a flowchart illustrating a sequence of identifying the kind of the measurement surface.

FIG. 11 is a flowchart illustrating a sequence of identifying the kind of the measurement surface.

First, the control unit 51 of the defect detection apparatus 50 displays a selection screen on which the kind of the measurement surface 61 is selected on the display unit 52. In step S11, the control unit 51 displays an object for selection as to whether the kind of a wall surface of the measurement surface 61 is a flat surface or a curved surface on the display unit 52. When the flat surface is selected, in step S12, the control unit 51 displays an object for selecting the kind of flat surfaces on the display unit 52. In step S12-1, when the vertical surface and the horizontal surface are selected, the control unit 51 sets a method of defining the vertical surface and the horizontal surface. As an example, the vertical surface is a wall surface of the structure. As an example, the horizontal surface is a ground surface or a ceiling surface. In step S12-2, when the inclined surface is selected, the control unit 51 sets a method of defining the inclined surface. As an example, the inclined surface is a slope surface.

When the curved surface is selected in step S11, in step S13, the control unit 51 displays an object for selecting the kind of curved surfaces on the display unit 52. When the curved surface on which the design data exists is selected, in step S13-1, the control unit 51 sets a method of defining including the design data. When the curved surface on the circular column or the elliptical column is selected, in step S13-2, the control unit 51 sets a method of defining the curved surface on the circular column or the elliptical column. When the free-form surface is selected, in step S13-3, the control unit 51 sets a method of defining the free-form surface.

Figure 12:
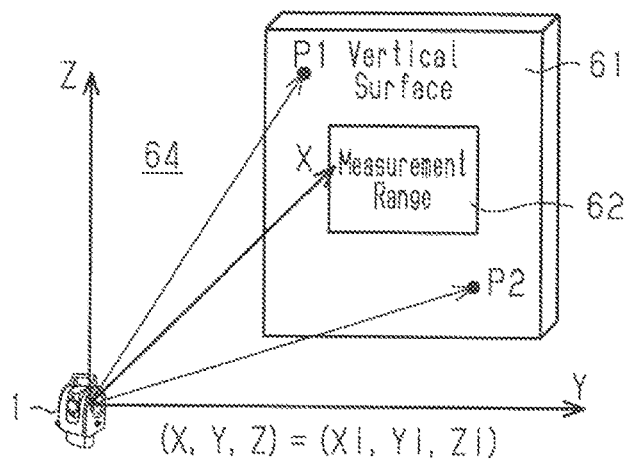
FIG. 12 is a diagram illustrating a definition method when the measurement surface is a vertical surface.

FIG. 12 is a diagram illustrating the method of defining the measurement surface 61 that is the vertical surface in step S12-1. In the method of defining the measurement surface 61 that is the vertical surface, arbitrary two observation points P1 and P2 within the measurement surface 61 on the vertical measurement surface 61 are captured with the second imaging unit 12 and are designated, for example, by using the laser pointer 16, and surveying is performed through angle measurement and distance measurement of the observation points P1 and P2. The surveying instrument 1 defines a vertical surface including the arbitrary observation points P1 and P2 for which collimation and distance measurement are performed as the measurement surface 61 in accordance with the control of the control unit 51.

Figure 13:
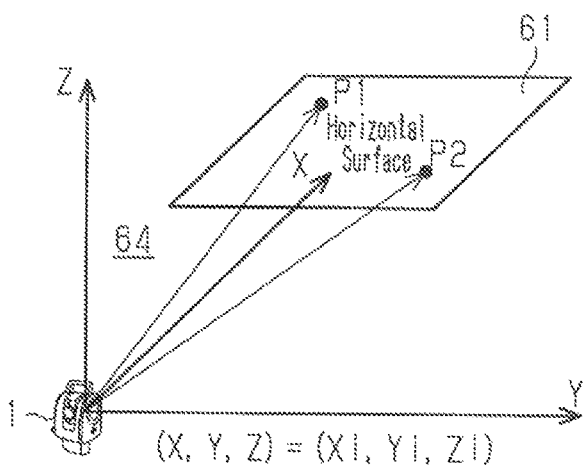
FIG. 13 is a diagram illustrating a definition method when the measurement surface is a horizontal surface.

FIG. 13 is a diagram illustrating the method of defining the measurement surface 61 that is a horizontal surface in step S12-1. In the method of defining the measurement surface 61 that is the horizontal surface, arbitrary two observation points P1 and P2 within the measurement surface 61 on the horizontal measurement surface 61 are captured with the second imaging unit 12 and are designated, for example, by using the laser pointer 16, and surveying is performed through angle measurement and distance measurement of the observation points P1 and P2. The surveying instrument 1 defines a horizontal surface including the arbitrary observation points P1 and P2 for which collimation and distance measurement are performed as the measurement surface 61 in accordance with the control of the control unit 51.

The number of the arbitrary observation points of the vertical surface and the horizontal surface is not particularly limited as long two or more points are set.

Figure 14:
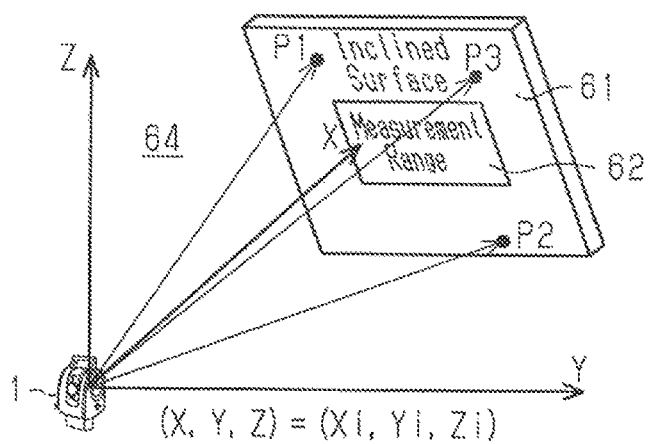
FIG. 14 is a diagram illustrating a definition method when the measurement surface is an inclined surface.

FIG. 14 is a diagram illustrating the method of defining the measurement surface 61 that is an inclined surface in step S12-2. In the method of defining the measurement surface 61 that is the inclined surface, arbitrary three observation points P1, P2, and P3 within the measurement surface 61 on the inclined measurement surface 61 are captured with the second imaging unit 12 and are designated, for example, by using the laser pointer 16, and surveying is performed through angle measurement and distance measurement of the observation points P1, P2, and P3. The surveying instrument 1 defines an inclined surface including the arbitrary observation points P1, P2, and P3 for which angle measurement and distance measurement are performed as the measurement surface 61 in accordance with the control of the control unit 51.

The number of the arbitrary measurement points of the inclined surface is not particularly limited as long as three or more points are set.

As an example, when defining the measurement surface 61 in accordance with the control of the control unit 51, the surveying instrument 1 always performs angle measurement and distance measurement for three or more points, and makes a determination as to whether the measurement surface 61 is a vertical, horizontal, or inclined surface on the basis of the observation data of three points.

In a case where the kind of the measurement surface 61 is the curved surface, a part of the curved surface is approximated to a flat surface, and definition of the measurement surface 61 is performed.

In a case where the measurement surface 61 is the curved surface in which the design data exists in step S13-1, the surveying instrument 1 performs observation of the observation points in accordance with the control of the control unit 51, and calculates global coordinate data. The surveying instrument 1 defines a tangential plane in the global coordinate data calculated through coordinate observation by design data stored in the storage unit 54 or the management server apparatus in accordance with the control of the control unit 51. The surveying instrument 1 performs definition of the tangential plane for a plurality of sites in accordance with the control of the control unit 51 to define the measurement surface 61.

In a case where the measurement surface 61 is the curved surface on the circular column or the elliptical column in step S13-2, the surveying instrument 1 performs observation of the observation points for a plurality of three or more points on a wall surface in accordance with the control of the control unit 51, and calculates global coordinate data. As an example, the observation points are three or more points of which a radius can be calculated. The control unit 51 defines a circle or an ellipse from a plurality of pieces of the global coordinate data acquired. The surveying instrument 1 defines a tangential plane of the circle of the observation points in accordance with the control of the control unit 51 to define the measurement surface 61.

Figure 15:
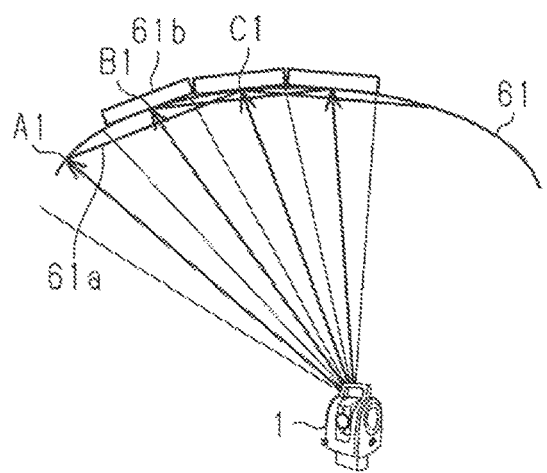
FIG. 15 is a diagram illustrating a definition method of the measurement surface when the measurement surface is a free-form surface.

FIG. 15 is a diagram illustrating a definition method when the measurement surface 61 in step S13-3 is the free-form surface. In a case where the measurement surface 61 is the free-form surface, the surveying instrument 1 performs observation of observation points for a plurality of three or more points on a wall surface in accordance with the control of the control unit 51. In accordance with the control of the control unit 51, the surveying instrument 1 defines a flat surface 61a that passes through two observation points A1 and C1 on the opposite sides among three contiguous observation points A1, B1, and C1, and offsets the defined flat surface 61a to a position that passes through the observation point B1 on the center to define the measurement surface 61 with an approximated plane 61b. As an example, the surveying instrument 1 may define the plane 61b that is approximated to the flat surface 61a that passes through two observation points A1 and B1 adjacent to each other in accordance with the control of the control unit 51. The surveying instrument 1 defines the measurement surface 61 by the approximated flat surface 61a in accordance with the control of the control unit 51.

[Definition of Measurement Range (Step S6)]

Figure 16A:
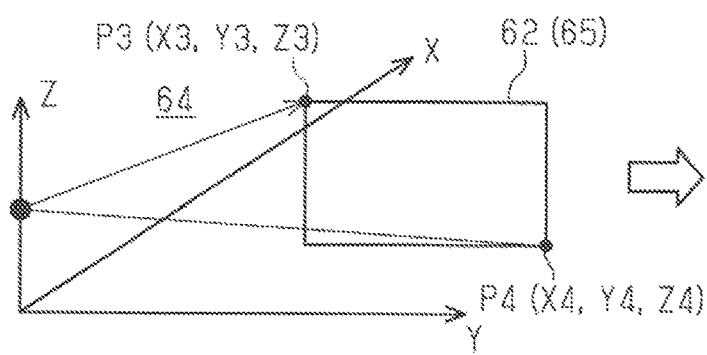
FIGS. 16A and 16B are diagrams illustrating a method of designating a measurement range that does not directly face the surveying instrument.

As illustrated in FIG. 16A, in a case where the measurement surface 61 including the measurement range 62 is a vertical surface, in accordance with the control of the control unit 51, the surveying instrument 1 designates arbitrary two observation points P3 and P4 within the measurement surface 61 by using the laser pointer 16 while performing imaging with the second imaging unit 12, and performs angle measurement for the observation points P3 and P4. An angle measurement position is calculated as global coordinate data (P3 (X3, Y3, Z3), P4 (X4, Y4, Z4)) because the measurement surface 61 is defined. The measurement range 62 is a range projected onto the measurement surface 61 that is defined instead of a range designated by the observation points P3 and P4, which are simply designated. In a case where the measurement range 62 directly faces the surveying instrument 1, the measurement range 62 is a rectangle in which the observation points P3 and P4 are set as opposite corners.

Figure 16B:
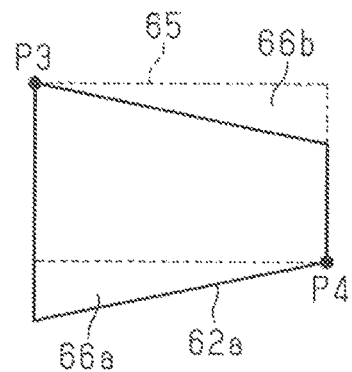

As illustrated in FIG. 16B, in a case where the measurement range 62 does not directly face the surveying instrument 1, when the measurement range 62 is simply set as a rectangle 65 in a range of the P3 and P4 from only measured angles, a region 66a for which observation is partially impossible occurs. An unnecessary region 66b, which is not included in the measurement range 62, also occurs in the rectangle 65. The surveying instrument 1 acquires and sets a measurement range 62a that is projected onto the defined measurement surface 61 through calculation in accordance with a control of the control unit 51. The measurement range 62a is a quadrangle in which a side far away from the surveying instrument 1 is shorter than a side close to the surveying instrument 1.

As an example, the arbitrary observation points P1 and P2, which are designated when defining the measurement surface 61, may be used as they are as the observation points P3 and P4 for designating the measurement range.

The measurement range 62 is not limited to a case where only one rectangular shape exists. A plurality of the measurement ranges 62 may exist, or two or more measurement ranges may be added. In addition, a partial range of the designated measurement range may be excluded.

Figure 17A:
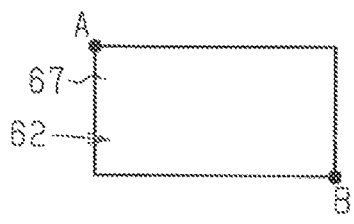
FIG. 17A is a diagram illustrating a method of defining a measurement range, and illustrating a state in which the measurement range is set by designating two points.

FIG. 17A is a diagram illustrating a state in which two points are designated to set a measurement range. In a case where two points A and B are designated, the measurement range 62 is a rectangle 67 in which the two points A and B, which are designation points, are set as opposite corners.

Figure 17B:
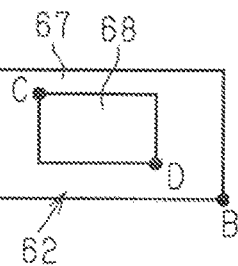
FIG. 17B is a diagram illustrating a case where a part of the measurement range that is set is excluded.

FIG. 17B is a diagram illustrating a case where a part of the measurement range that is set is excluded from the measurement range. In a case where two points C and D, which are designation points and exist on the inner side of the rectangle 67, are further designated, a rectangle 68, in which the two points C and D are set as opposite corners, is designated on the inner side of the rectangle 67. As an example, the rectangle 68 is set as a region that is excluded from the rectangle 67 of the measurement range 62.

Figure 17C:
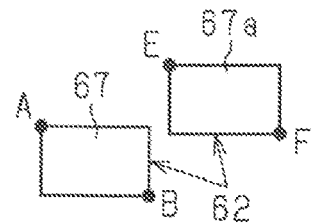
FIG. 17C is a diagram illustrating a state in which the measurement range is set at a plurality of sites.

FIG. 17C is a diagram illustrating a state in which the measurement range is set at a plurality of sites. In a case where two points E and F are further designated on the outer side of the rectangle 67, in which the designation points A and B are designated, a rectangle 67a, which is an additional measurement range 62, in which the two points E and F are set as opposite corners, is set.

Figure 17D:
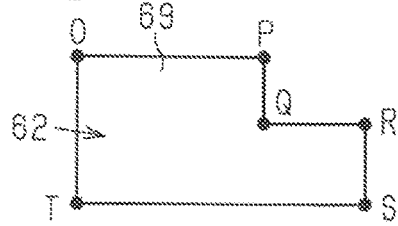
FIG. 17D is a diagram illustrating a state in which the measurement range is set by designating six points.

FIG. 17D is a diagram illustrating a state in which six points are designated to set a measurement range. As an example, with regard to the measurement range 62, a measurement range 62 having a shape 69 other than a rectangle by designating six points O, P, Q, R, S, and T as designation points. The number of designation points is not limited, and it is possible to designate a measurement range 62 having various shapes in accordance with the number of three or more designation points.

Figure 17E:
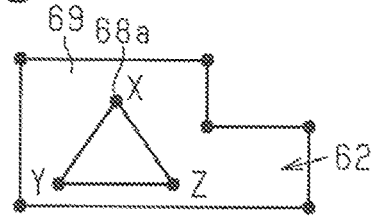
FIG. 17E is a diagram illustrating a case where a part of the measurement range that is set is excluded and is deleted from the measurement range.

FIG. 17E is a diagram illustrating a case where a part of a measurement range that is set by designating six points is excluded. In a measurement range 62, it is possible to designate a triangle 68a that is an excluded region by designating three points X, Y, and Z, which are designation points, on the inner side of a shape 69 other than a rectangle. The excluded region can be a shape other than the triangle by setting the designation points to three or more points.

As an example, in a case of designating three or more points, adjacent designation points may be connected by a curved line instead of being connected by a straight line. As an example, the straight line and the curved line can be selected in accordance with an operation of the operation unit 53 by the user.

Figure 18:
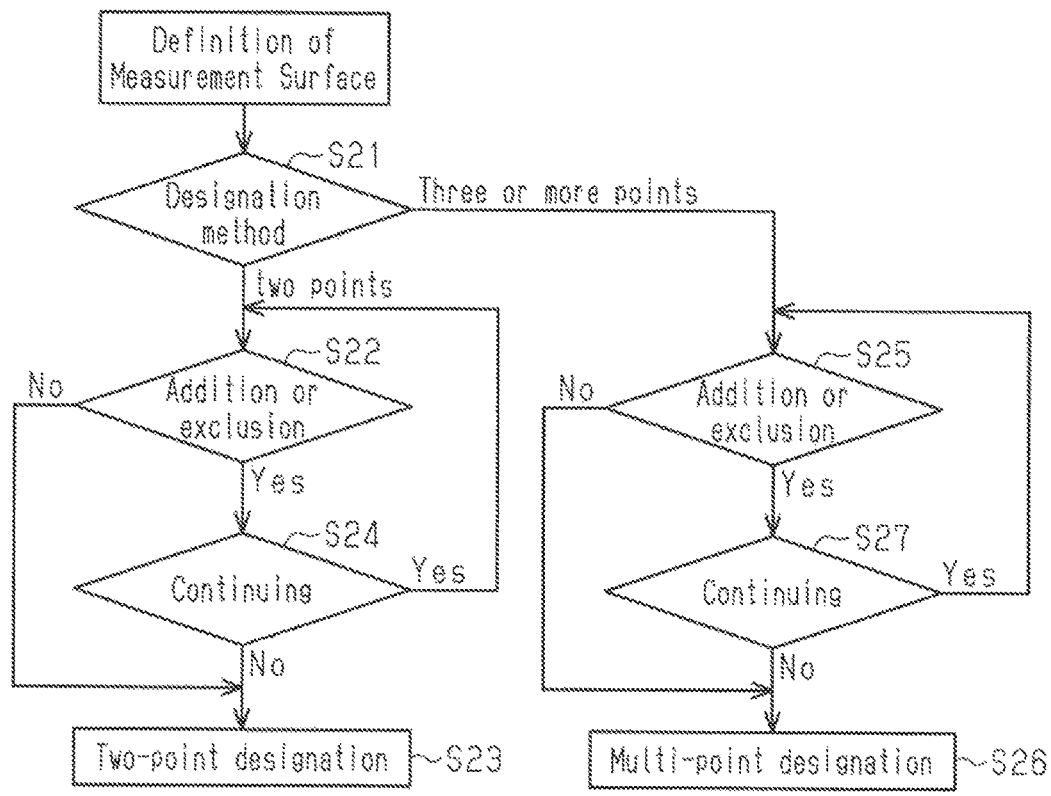
FIG. 18 is a flowchart illustrating a sequence of defining the measurement range.

FIG. 18 is a flowchart illustrating a sequence of defining a measurement range. First, the control unit 51 of the defect detection apparatus 50 displays a selection screen of the measurement range 62 on the display unit 52.

As illustrated in FIG. 18, in step S21, the control unit 51 displays an object for selection as to whether the number of designation points for designating the measurement range 62 is two points or three or more points on the display unit 52. When the number of designation points for designating the measurement range 62 is two, in step S22, the control unit 51 displays an object for selection as to whether or not the measurement range 62 is added or excluded on the display unit 52. When not performing the process of adding or excluding the measurement range 62 in step S22, and when not continuing the process of adding or excluding the measurement range 62 in step S24, in step S23, the control unit 51 proceeds to a range designation process by two-point designation as illustrated in FIGS. 17A to 17C.

When the number of designation points for designating the measurement range 62 is three or more, in step S25, the control unit 51 displays an object for selection as to whether or not the measurement range 62 is added or excluded on the display unit 52. When not performing the process of adding or excluding the measurement range 62 in step S25, and when not continuing the process of adding or excluding the measurement range 62 in step S27, in step S26, the control unit 51 proceeds to a range designation process by multi-point designation as illustrated in FIGS. 17D and 17E.

As an example, in a case of designating the measurement range 62 including a point deviating from the measurement surface 61 that is defined, the control unit 51 displays an error display indicating that the point to be designated is not included in the measurement surface 61, or an error display indicating that the point to be designated cannot be designated as the measurement range 62 on the display unit 52.

[Automatic Measurement (Step S7)]

The entirety of the measurement range 62 that is set may not be covered by imaging performed once by the first imaging unit 11 depending on the size of the measurement range 62. As an example, the surveying instrument 1 drives and controls the horizontal angle drive unit 15 and the vertical angle drive unit 17 such that imaging ranges overlap each other and an overlapping region does not increase more than necessary in accordance with the control of the control unit 51. The surveying instrument 1 captures the image of the entire measurement range 62 in accordance with the control of the control unit 51.

Figure 19:
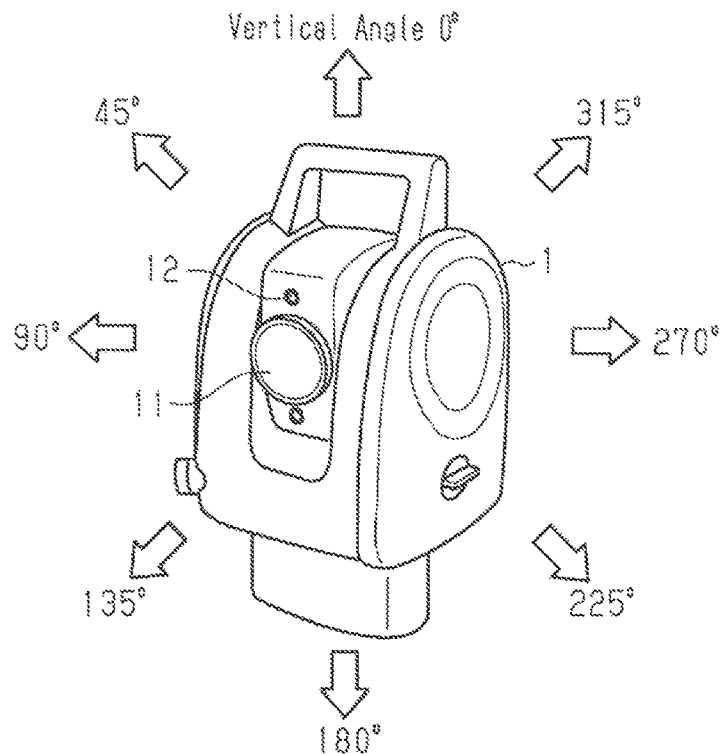
FIG. 19 is a diagram illustrating a rotation range around a horizontal axis of the surveying instrument.

FIG. 19 is a diagram illustrating a rotation range of the surveying instrument 1 around the horizontal axis. Rotation of the surveying instrument 1 around the horizontal axis O2 by the vertical angle drive unit 17 is controlled as follows.

As an example, in a case where the kind of the measurement surface 61 is the vertical surface, the inclined surface, and the curved surface, generally, the imaging unit 7 is rotated around the horizontal axis O2 at a vertical angle in a range of 45° to 135°. In addition, in a case where the kind of the measurement surface 61 is the vertical surface, the inclined surface, and the curved surface, generally, the imaging unit 7 is rotated around the horizontal axis O2 at a vertical angle in a range of 225° to 315°.

As an example, in a case of a ceiling surface, generally, the imaging unit 7 is rotated around the horizontal axis O2 at a vertical angle in a range of 0° to 45°. In addition, in a case of the ceiling surface, generally, the imaging unit 7 is rotated around the horizontal axis O2 at a vertical angle in a range of 315° to 360°.

The vertical angle is an angle defined as follows. Specifically, in a rotation angle of the imaging unit 7 around the horizontal axis O2, when a collimation direction of the surveying instrument 1 faces the ceiling, the vertical angle is expressed by 0°, when the collimation direction faces a horizontal direction, the vertical angle is expressed by 90°.

Figure 20:
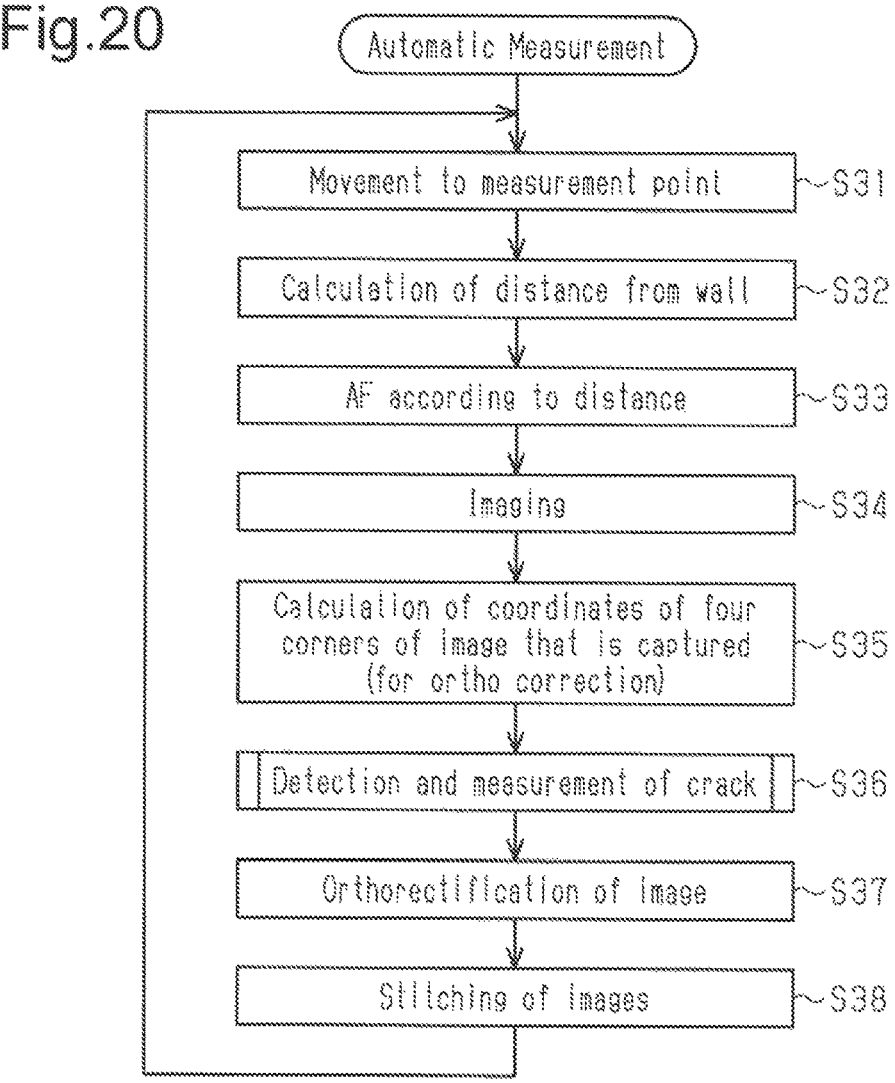
FIG. 20 is a flowchart illustrating a sequence of automatic measurement by a first imaging unit.

FIG. 20 is a flowchart illustrating a detailed sequence of the automatic measurement illustrated in step S7.

In step S31, in accordance with the control of the control unit 51, the surveying instrument 1 controls the horizontal angle drive unit 15 and the vertical angle drive unit 17 to rotate the imaging unit 7, such that imaging regions within the measurement range 62 can be sequentially captured. In addition, in accordance with the control of the control unit 51, the surveying instrument 1 captures the image of a current imaging region and sequentially moves to adjacent imaging regions within the measurement range 62 to automatically measure the entirety of regions of the measurement range 62 by the first imaging unit 11.

Furthermore, details of the automatic measurement of the surveying instrument 1 will be described later.

In step S32, the surveying instrument 1 calculates the distance from respective imaging regions in accordance with the control of the control unit 51. In step S33, the surveying instrument 1 performs an auto focus control of the first imaging unit 11 in accordance with the control of the control unit 51. In the auto focus control, a focus lens that constitutes the first optical system in the first imaging unit 11 is displaced along the optical axis direction in accordance with a focus adjustment instruction from the control unit 40, and light is focused on the first imaging element.

As an example, in the auto focus control, the distance between observation points and the surveying instrument 1 is calculated from global coordinate data of a measurement point and global coordinate data indicating the position of the surveying instrument 1, and the focus lens is displaced along the optical axis direction on the basis of the distance that is calculated.

As an example, in the auto focus control, the distance measurement unit 13 measures the distance between the surveying instrument 1 and the observation points, and the focus lens is displaced along the optical axis direction on the basis of the distance that is measured.

As an example, the auto focus control is performed with a contrast method in which the focus lens is displaced to a position at which contrast is the maximum.

The measurement surface 61 is a concrete wall surface in many cases, and thus it is difficult to detect the contrast. With regard to the auto focus control, a method that is executed on the basis of the distance measured in step S33 is preferable.

In step S34, the surveying instrument 1 captures the image of each imaging range 63 of a first angle of view in the measurement range 62 in accordance with the control of the control unit 51. The surveying instrument 1 calculates angles (HA and VA) of an observation point O indicated by the center of a reticle in the imaging range 63 in accordance with the control of the control unit 51. In accordance with the control of the control unit 51, the surveying instrument 1 calculates global coordinate data of each pixel of external appearance image data that is captured through conversion of angle from the observation point O that is the observation center. According to this, the entirety of pixels in the imaging range 63 are converted into the global coordinate data.

As an example, when a defect is detected in the external appearance image data, the surveying instrument 1 calculates pixels at a start point and an end point of the defect through conversion of an angle from the observation point O that is the observation center as position data.

The surveying instrument 1 transmits the external appearance image data in which the position of a pixel is identified by the global coordinate data to the defect detection apparatus 50. The control unit 51 sequentially displays external appearance image based on the external appearance image data on the display unit 52.

As an example, the surveying instrument 1 calculates global coordinate data of the entirety of pixels as position data of the external appearance image data that is captured, and outputs the global coordinate data to the defect detection apparatus 50.

In step S35, the surveying instrument 1 calculates coordinate data of the four corners of the external appearance image that is captured to perform orthorectification processing in accordance with the control of the control unit 51. The coordinate data of the four corners is coordinate data of pixels of the four corners in the external appearance image data.

In step S36, the control unit 51 performs detection of a defect such as a crack and a concavity for the external appearance image data that is captured, and measures the position, the length, and the width of the defect.

Furthermore, details relating to the defect detection will be described later.

In step S37, the control unit 51 performs orthorectification processing of the external appearance image data. As an example, the control unit 51 functions as an orthorectification processing unit that performs the orthorectification processing on the external appearance image data.

In step S38, the control unit 51 performs a stitching processing unit of connecting a plurality of pieces of the external appearance image data. As an example, the control unit 51 functions as a stitching processing unit that performs stitching processing of connecting first external appearance image data subjected to the orthorectification processing and second external appearance image data subjected to the orthorectification processing to each other.

Furthermore, details of the orthorectification processing and the stitching processing unit will be described later.

[Automatic Measurement of Surveying Instrument 1 (Step S31)]

In a case where the wall surface that is the measurement surface 61 is the vertical surface, the inclined surface, and the curved surface, generally, the imaging unit 7 is rotated around the horizontal axis O2 at the vertical angle in a range of 45° to 135°. In addition, in a case where the wall surface that is the measurement surface 61 is the vertical surface, the inclined surface, and the curved surface, generally, the imaging unit 7 is rotated around the horizontal axis O2 at the vertical angle in a range of 225° to 315°.

Figure 21:
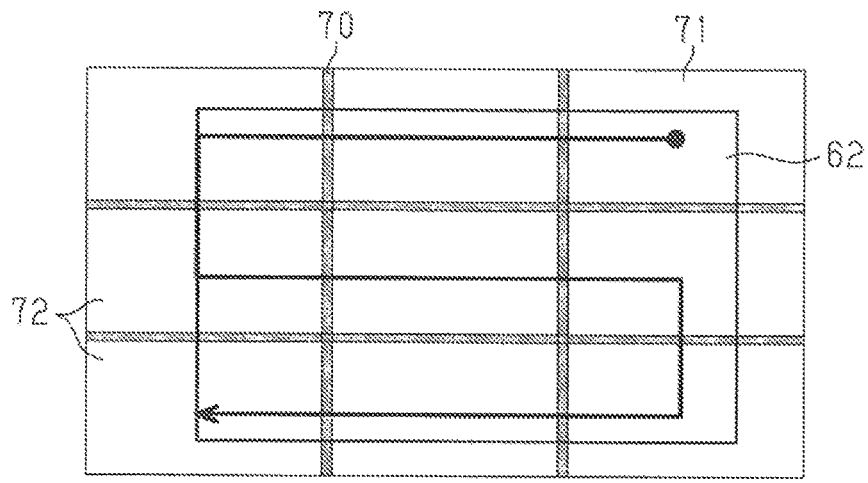
FIG. 21 is a diagram illustrating an automatic measurement state in which a measurement range of the vertical surface is set to a tile shape.

FIG. 21 is a diagram illustrating an automatic measurement state in which the measurement range 62 of the vertical surface is set to a tile shape.

As an example, the measurement range 62 is a rectangle. As an example, a measurement exclusion region does not exist on the inner side of the measurement range 62. The surveying instrument 1 captures a rectangular total imaging range 71 wider than the measurement range 62 by using the first imaging unit 11 in accordance with the control of the control unit 51. In the automatic measurement, the first imaging unit 11 that is set to the first angle of view is used. The first imaging unit 11 captures the image of the total imaging range 71 such that the majority of imaging regions 72 set to the first angle of view do not overlap each other. As an example, the imaging regions 72 include an overlapping part 70 at which edges of the imaging regions 72 adjacent to each other in an upper and lower direction and a right and left direction overlap each other. As an example, the imaging regions 72 are rectangles having the same size. As an example, the imaging regions 72 may be squares having the same size. The surveying instrument 1 captures the image of the total imaging range 71 in such a manner that the imaging regions 72 are lined up in a tile shape. As an example, the surveying instrument 1 images the total imaging range 71 while moving the first imaging unit 11 in an S-shape within the total imaging range 71. Imaging may be initiated at any end of an S-shaped route. As an example, the surveying instrument 1 sequentially performs imaging in a route capable of continuously imaging the total imaging range 71. As an example, the surveying instrument 1 sequentially captures the image of the total imaging range 71 in a route in which the amount of movement of the imaging unit 7 by the horizontal angle drive unit 15 and the vertical angle drive unit 17 is the minimum. As an example, the surveying instrument 1 preferentially sets an imaging region 72 that is captured subsequently to a current imaging region 72 as an imaging region 72 that is adjacent to the current imaging region 72.

Figure 22:
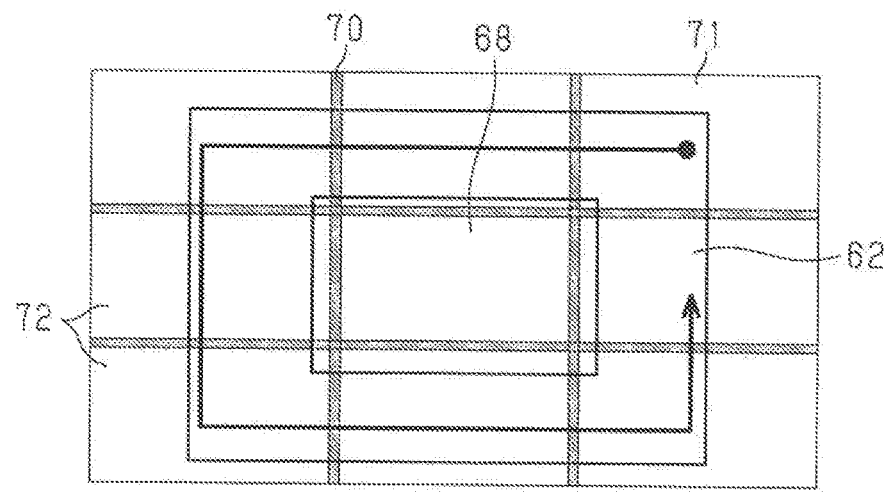
FIG. 22 is a diagram illustrating automatic measurement in a case where the measurement range of the vertical surface includes an exclusion region.

FIG. 22 is a diagram illustrating automatic measurement in a case where the measurement range of the vertical surface includes an exclusion region.

The measurement range 62 includes a rectangle 68 that is an exclusion region of the measurement range on the inner side. The surveying instrument 1 sequentially captures an image in a route that surrounds the rectangle 68 in accordance with the control of the control unit 51. In a case where the route is an annular shape, imaging may be initiated from any position of the annular route. As an example, the surveying instrument 1 captures the image of the total imaging range 71 with priority given to any one imaging region 72 adjacent to a current imaging region 72. As an example, the surveying instrument 1 preferentially sets an imaging region 72 that is captured subsequently to the current imaging region 72 as an imaging region 72 that is adjacent to the current imaging region 72. Accordingly, selection of the imaging route across the rectangle 68 does not exclude a case where only the exclusion region exists as a candidate of the subsequent movement destination.

In a case of the ceiling surface, the imaging unit 7 is rotated around the vertical axis O1 and the horizontal axis O2 at the vertical angle in a range of 0° to 45°. In addition, in a case of the ceiling surface, the imaging unit 7 is rotated around the vertical axis O1 and the horizontal axis O2 at the vertical angle in a range of 315° to 360°.

Figure 23:
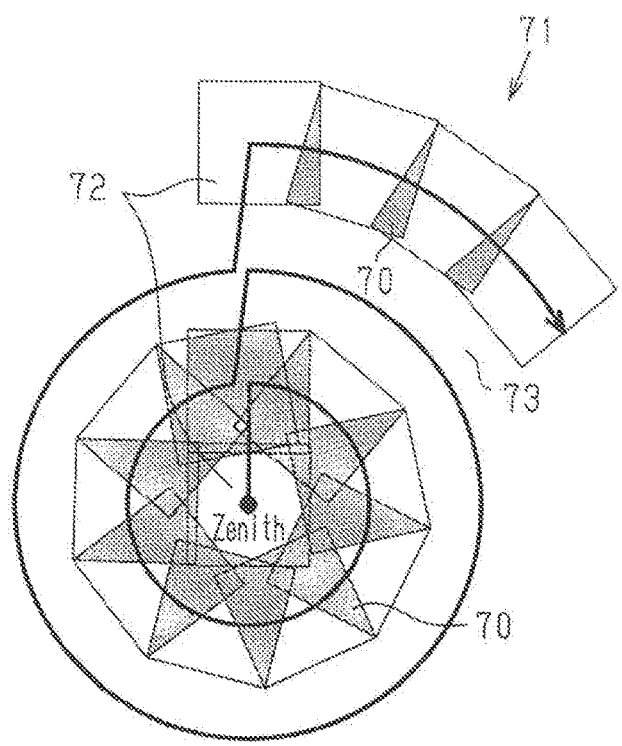
FIG. 23 is a diagram illustrating a state in which a ceiling surface is set to a concentric circular shape and imaging is performed in the same direction.

FIG. 23 is a diagram illustrating a state in which the ceiling surface is captured concentrically in the same direction.

The surveying instrument 1 captures the image of the total imaging range 71 by using the first imaging unit 11 in accordance with the control of the control unit 51. In the automatic measurement, the surveying instrument 1 captures the image of the total imaging range 71 while allowing for an overlapping part 70, in which imaging regions 72, which are adjacent to each other in an upper and lower direction and a right and left direction, overlap with each other. As an example, the imaging regions 72 are squares. As an example, the imaging regions 72 are rectangles. In a case of the rectangles, it is possible to enlarge the range of a single image of the imaging region 72. In a case of the squares, the first angle of view is changed into a square. The surveying instrument 1 captures the image of the total imaging range 71 in such a manner that the imaging regions 72 are concentric with each other with the zenith set as the center. As an example, after capturing the image of the zenith in the total imaging range 71, the surveying instrument 1 sequentially captures the image of the imaging regions 72 in the same direction while rotating around an imaging region 72 including the zenith in the same direction. Imaging may be initiated from the zenith or the outer peripheral end. As an example, the surveying instrument 1 sequentially captures the image of the inside of the total imaging range 71 in a route capable of continuously capturing the image. As an example, the surveying instrument 1 controls the horizontal angle drive unit 15 such that the imaging unit 7 sequentially rotates around the vertical axis O1 by a predetermined angle in accordance with the control of the control unit 51. As an example, the surveying instrument 1 sequentially captures the image of the inside of the total imaging range 71 in such a manner that the amount of movement of the imaging unit 7 by the horizontal angle drive unit 15 and the vertical angle drive unit 17 is the minimum. As an example, in a case where an exclusion region 73 exists in a region adjacent to a current imaging region 72, the surveying instrument 1 gives a priority to the adjacent imaging region 72 in comparison to the exclusion region 73 before the subsequent movement.

Figure 24:
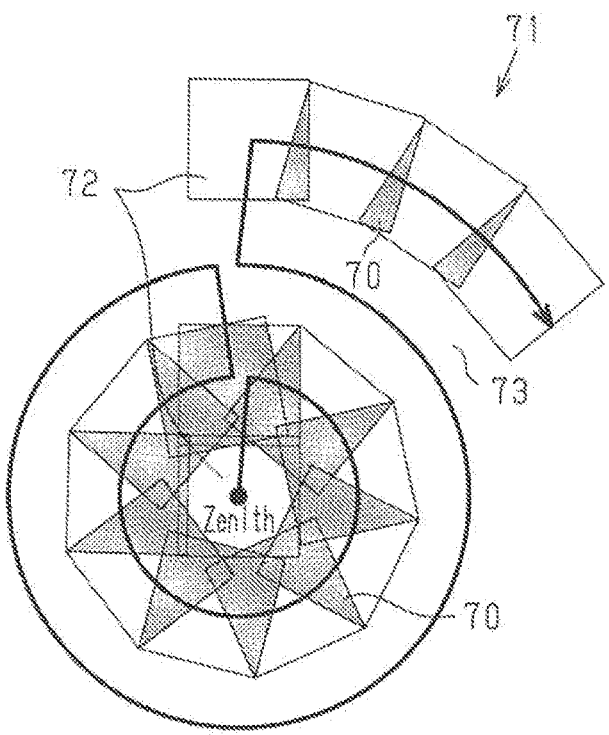
FIG. 24 is a diagram illustrating a state in which after rotation in one direction along the ceiling surface, imaging is performed while rotating in the opposite direction.

FIG. 24 is a diagram illustrating a state in which after rotation in one direction along the ceiling surface, imaging is performed while rotating in the opposite direction.

As an example, the surveying instrument 1 is connected to the defect detection apparatus 50 in a wired manner. When the surveying instrument 1 continuously rotates around the vertical axis O1 in the same direction, a connection cable is wound around the surveying instrument 1. As an example, the surveying instrument 1 cannot continuously rotate around the vertical axis O1 in the same direction. As an example, in accordance with the control of the control unit 51, the surveying instrument 1 controls the horizontal angle drive unit 15 so as to rotate around the vertical axis O1 by 360° in one direction, and then rotates around the vertical axis O1 by 360° in the opposite direction. According to this, it is possible to prevent the cable that connects the surveying instrument 1 and the defect detection apparatus 50 in a wired manner from being wound around the surveying instrument 1.

Figure 25:
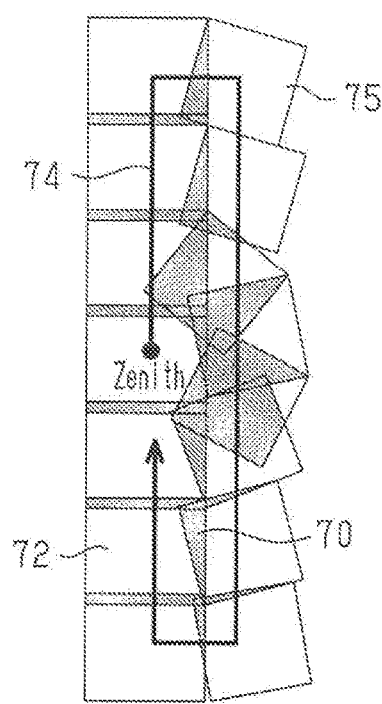
FIG. 25 is a diagram illustrating a state in which the image of the ceiling surface is captured in a radiation direction.

FIG. 25 is a diagram illustrating a state in which the ceiling surface is captured in a radiation direction.

The surveying instrument 1 captures an image in a radiation direction that passes through the zenith within the total imaging range 71. As an example, each imaging region 72 is a square. As an example, the imaging region 72 is a rectangle. In a case of the rectangle, it is possible to enlarge the range of a single image of the imaging region 72. Imaging may be initiated from the zenith or an end of a large vertical angle. As an example, the surveying instrument 1 sequentially captures the image of the total imaging range 71 in a route capable of continuously capturing an image. As an example, in a route 74 that passes through the zenith, the surveying instrument 1 captures images corresponding to one row in accordance with the control of the control unit 51 without rotating the imaging unit 7 around the vertical axis O1 by a predetermined angle step by step. Next, when capturing the image of a region 75 that expands from the one row of the imaging regions 72, which have been captured, the surveying instrument 1 controls the horizontal angle drive unit 15 to sequentially rotate the imaging unit 7 around the vertical axis O1 by a predetermined angle step by step. As an example, the surveying instrument 1 controls the horizontal angle drive unit 15 and the vertical angle drive unit 17 such that the amount of movement of the imaging unit 7 is the minimum within the total imaging range 71. As an example, in a case where an exclusion region 73 exists in a region adjacent to a current imaging region 72, the surveying instrument 1 gives a priority to the adjacent imaging region 72 in comparison to the exclusion region 73 before the subsequent movement.

Figure 26A:
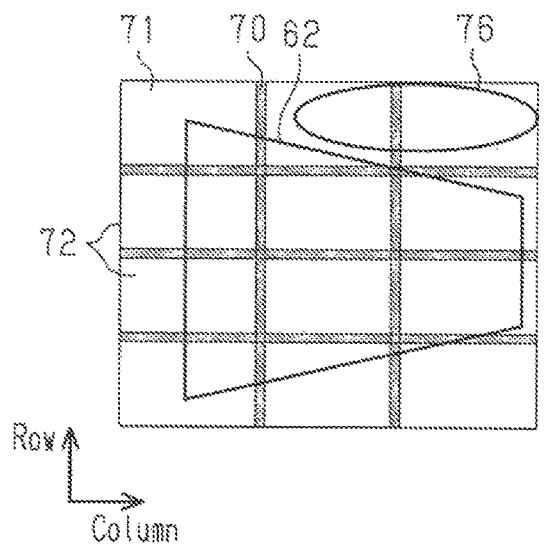
FIGS. 26A and 26B are diagrams illustrating an operation of controlling a first angle of view of the first imaging unit such that a region protruding from the outer edge is reduced when capturing the image of a region including the outer edge of the measurement range.
Figure 26B:
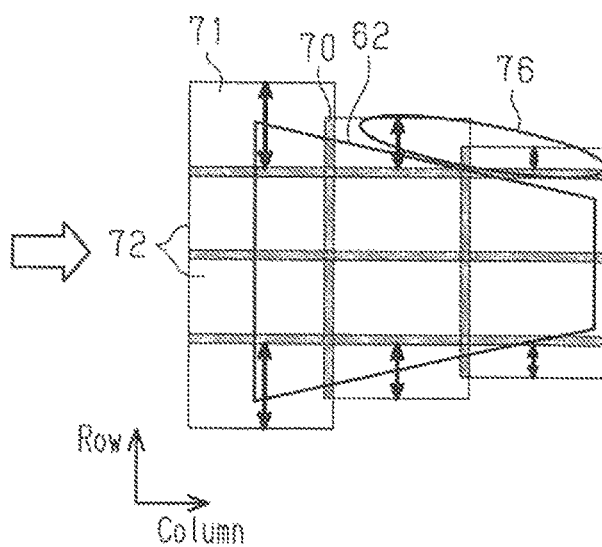

FIGS. 26A and 26B are diagrams illustrating an operation of controlling the first angle of view of the first imaging unit 11 such that a region 76 protruding from the outer edge of the measurement range 62 is reduced when capturing the image of a region including the outer edge of the measurement range 62 of the vertical surface.

As illustrated in FIG. 26A, in a case where the measurement range 62 does not directly face the surveying instrument 1, a measurement range 62, which is projected onto the measurement surface 61 that is defined, is set. The measurement range 62 is not a rectangle, and is a quadrangle in which a side far away from the surveying instrument 1 is shorter than a side close to the surveying instrument 1. As an example, in imaging regions 72 of a second column and a third column in a first row, and imaging regions 72 of a second column and a third column in a third row, the majority of the imaging regions 72 deviate from the measurement range 62. As illustrated in FIG. 26B, as an example, the surveying instrument 1 performs a control of reducing the first angle of view of the imaging regions 72 of the second column and the third column in the first row, and the imaging regions 72 of the second column and the third column in the third row in a vertical direction in accordance with the control of the control unit 51, thereby reducing the data size of the total imaging range 71.

FIG. 26 illustrates a configuration relating to the horizontal direction, but this is also true of a configuration relating to the vertical direction. That is, the farther the vertical angle deviates from 90° (270°), the greater the region 76 protruding from the outer edge of the measurement range 62 becomes. As an example, as the vertical angle further deviates from 90° (270°), the surveying instrument 1 performs a control of further reducing the first angle of view of the imaging region 72 in the horizontal direction in accordance with the control of the control unit 51, thereby reducing the data size of the total imaging range 71.

Figure 27:
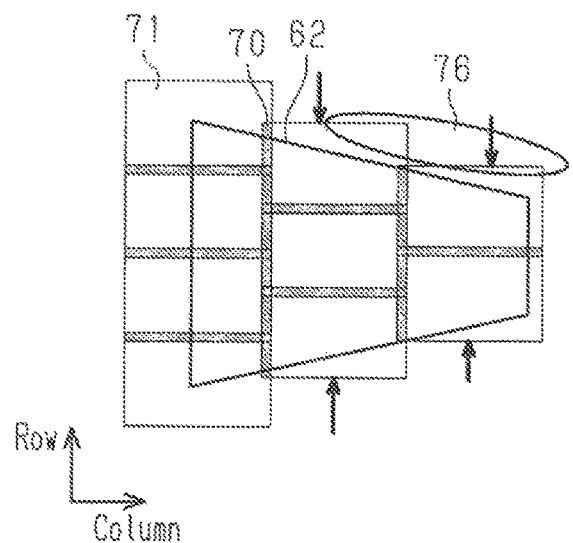
FIG. 27 is a diagram illustrating an operation of moving the position of an imaging region such that the region protruding from the outer edge is reduced when capturing the image of a region including the outer edge of the measurement range.

FIG. 27 is a diagram illustrating an operation of moving the position of the imaging region 72 such that the region 76 protruding from the outer edge is reduced when capturing the image of a region including the outer edge of the measurement range 62.

As an example, the surveying instrument 1 moves the imaging regions 72 located on the opposite ends of the second column and the third column in the vertical direction to approach the central line in a row direction in accordance with the control of the control unit 51 without changing the first angle of view. According to this, in comparison to a case illustrated in FIG. 26A, the number of the imaging regions 72 in the total imaging range 71 is changed from four to three in the second column, and is changed from four to two in the third column. The surveying instrument 1 can reduce the number of images to be captured in the total imaging range 71.

FIG. 27 illustrates a configuration relating to the horizontal direction, but this is also true of a configuration relating to the vertical direction. That is, the farther the vertical angle deviates from 90° (270°), the larger the region deviating from the measurement range becomes. In this case, as an example, as the vertical angle further deviates from 90° (270°), the surveying instrument 1 performs a control of further moving in the horizontal direction to approach the central line in a column direction in accordance with the control of the control unit 51 without changing the first angle of view, thereby reducing the number of images to be captured in the total imaging range 71.

Figure 28A:
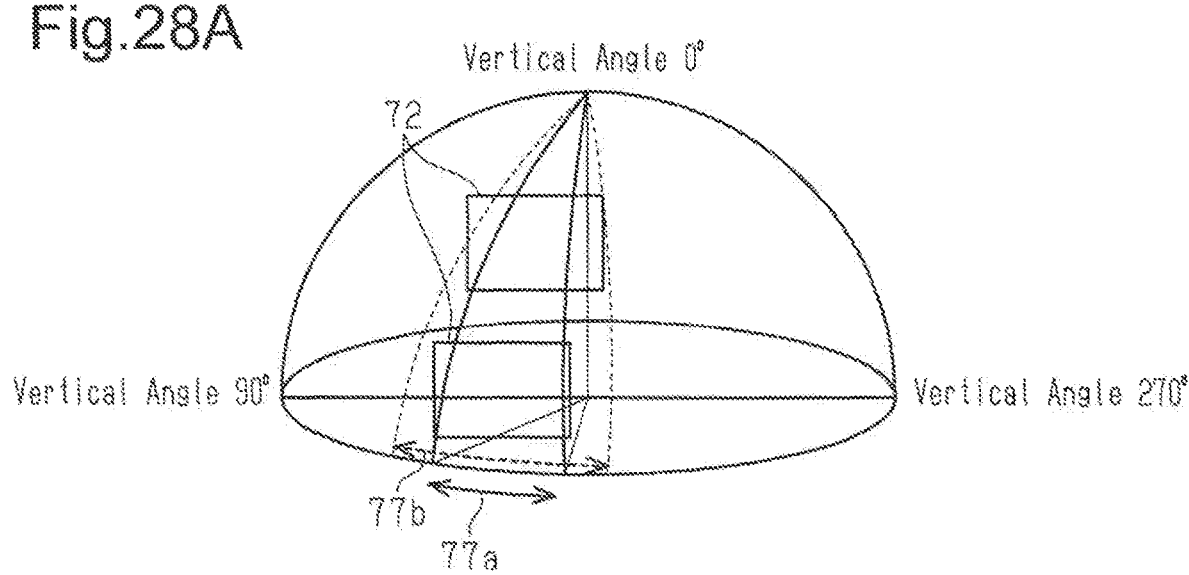
FIGS. 28A to 28C are diagrams illustrating an operation of rotating the first imaging unit such that the amount of rotation around the vertical axis increases as a vertical angle in a range of 0° (180°) to 180° (360°) deviates from 90° (270°).
Figure 28B:
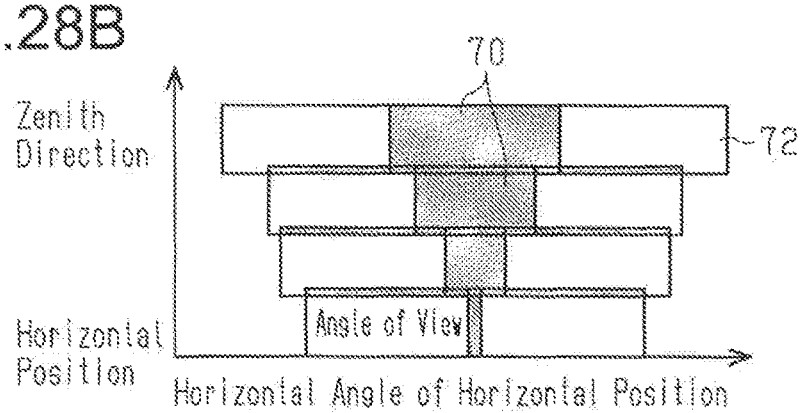
Figure 28C:
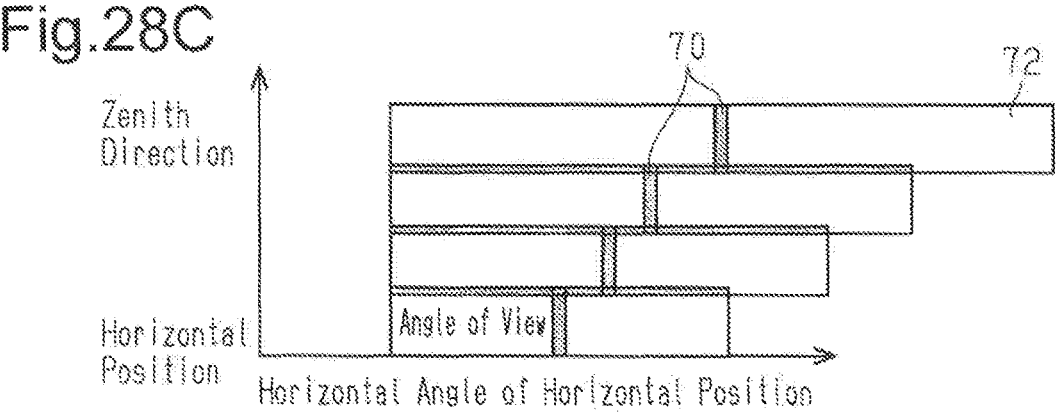

FIGS. 28A to 28C are diagrams illustrating an operation of rotating the first imaging unit 11 such that the horizontal angle when rotating the first imaging unit 11 around the vertical axis O1 increases as the vertical angle in a range of 0° to 180° deviates from 90°. In addition, FIGS. 28A to 28C are diagrams illustrating an operation of rotating the first imaging unit 11 such that the horizontal angle when rotating the first imaging unit 11 around the vertical axis O1 increases as the vertical angle in a range of 180° to 360° deviates from 270°.

A horizontal angle-equivalent range with respect to the imaging region 72 that is captured once varies depending on the vertical angle when being captured. As illustrated in FIG. 28A, as an example, a horizontal angle-equivalent range 77a when the vertical angle is 90° (270°) is narrower than a horizontal angle-equivalent range 77b when the vertical angle is approximately 45° (315°). The horizontal angle-equivalent range 77b with respect to the image that is captured increases as the vertical angle during image capturing deviates from 90° (270°).

As illustrated in FIG. 28B, when driving the vertical angle drive unit 17 around the horizontal axis O2 without rotating the first imaging unit 11 around the vertical axis O1 regardless of a difference of the vertical angle, the farther the vertical angle deviates from 90° (270°), the larger becomes an overlapping part 70 of the imaging regions 72 adjacent to each other in the horizontal direction. According to this, the number of images to be captured also increases, and an imaging time is also lengthened.

As illustrated in FIG. 28C, as an example, the surveying instrument 1 controls the horizontal angle drive unit 15 in accordance with the control of the control unit 51 such that the farther the vertical angle deviates from 90° (270°), the greater the amount of rotation of the first imaging unit 11 around the vertical axis O1 becomes. According to this, the overlapping part 70 of the imaging regions adjacent to each other decreases, and it is possible to reduce the number of images to be captured.

Figure 29A:
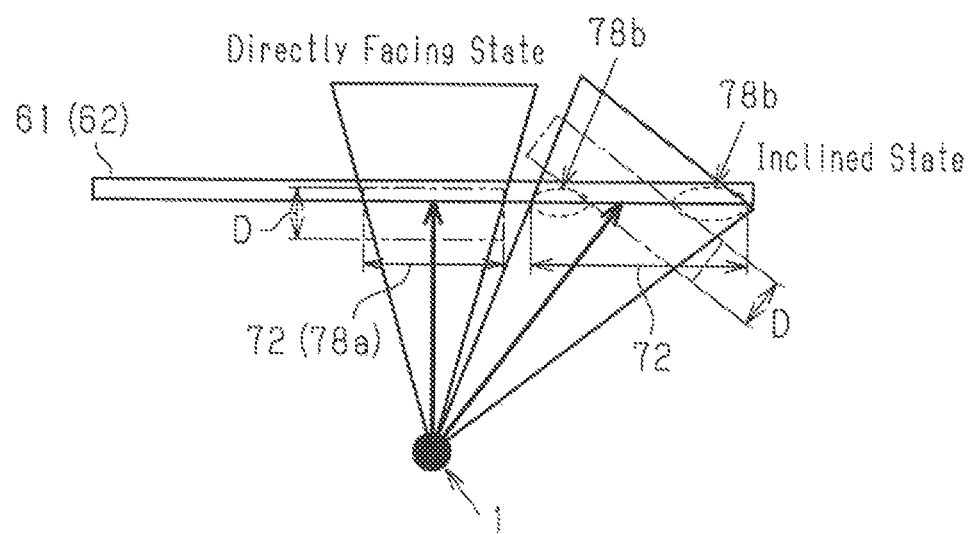
FIGS. 29A and 29B are diagrams illustrating an imaging operation by the first imaging unit in a state in which the first angle of view is reduced so as not to include a region that deviates from the focus depth in a case where the region deviating from the focus depth is included in an edge portion of the first angle of view within the first angle of view.
Figure 29B:
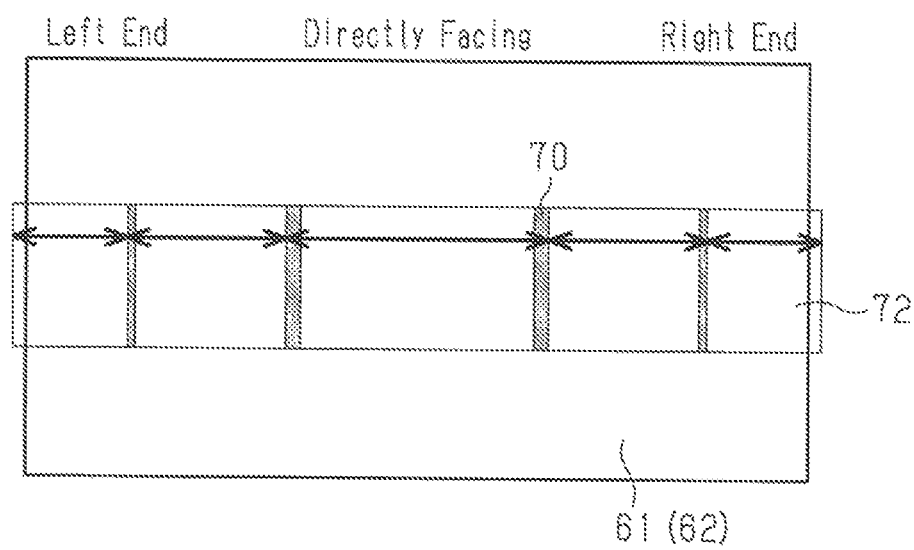

FIGS. 29A and 29B are diagrams illustrating an imaging operation by the first imaging unit 11 in a state in which the first angle of view is reduced so as not to include a region that deviates from a focus depth D in a case where the region deviating from the focus depth D is included in an edge portion of the first angle of view within the first angle of view of the first imaging unit 11.

Since the measurement surface 61 is defined, the distance between the surveying instrument 1 and the observation point of the measurement surface 61 is already known. Accordingly, the first imaging unit 11 can perform focusing in accordance with the distance between the surveying instrument 1 and an observation point on the measurement surface 61. As illustrated in FIG. 29A, in a case where the imaging region 72 in the measurement range 62 of the measurement surface 61 directly faces the surveying instrument 1, the entirety of the imaging region 72 of the first angle of view is located within the focus depth D, and is a focus region 78a that is focused. In a case where the imaging region 72 does not directly face the surveying instrument 1, and the surveying instrument 1 is in a state of being inclined with respect to the measurement surface 61, an edge portion of the imaging region 72 of the first angle of view is a defocus region 78b deviating from the focus depth. The greater the inclination of the surveying instrument 1 with respect to the measurement surface 61, the larger the defocus region 78b becomes.

As illustrated in FIG. 29B, in accordance with the control of the control unit 51, the surveying instrument 1 captures the image of the first angle of view at a position directly facing the imaging region 72, and reduces the first angle of view in the horizontal direction as it approaches either of the ends on the right and left sides in order for the defocus region 78b not to be included. The entirety of the imaging regions 72 is the focus region 78a. The surveying instrument 1 controls the horizontal angle drive unit 15 to control the first imaging unit 11 so as to sequentially reduce the first angle of view in the horizontal direction when capturing an image in a direction that is close to the right end or the left end of the measurement range 62. An external appearance image that is captured is a narrow image when capturing an image in a direction close to the right end or the left end of the measurement range 62.

FIG. 29 illustrates a configuration relating to the horizontal direction, but this is also true of a configuration relating to the vertical direction. That is, the farther the vertical angle deviates from 90° (270°), the larger the defocus region 78b becomes. In this case, as an example, the surveying instrument 1 controls the first imaging unit 11 to sequentially reduce the first angle of view in the vertical direction as the vertical angle deviates from 90° (270°) in accordance with the control of the control unit 51.

Figure 30A:
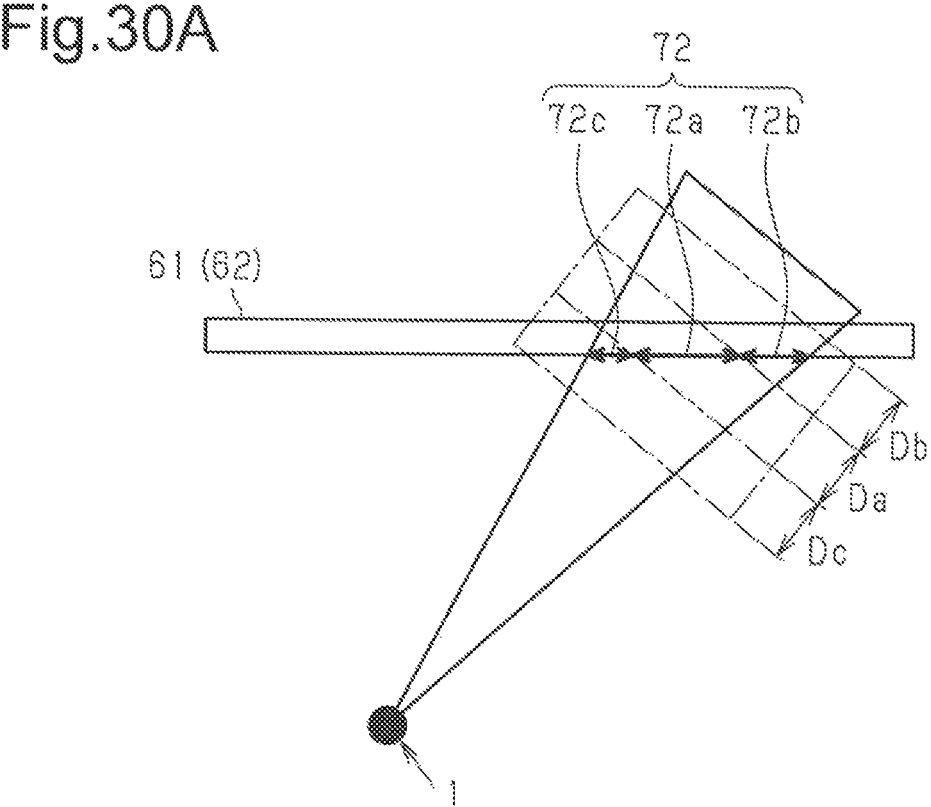
FIGS. 30A and 30B are diagrams illustrating an imaging operation in the first imaging unit in a state in which the focus is adjusted to the region that deviates from the focus depth in a case where the region deviating from the focus depth D is included in the edge portion of the first angle of view within the first angle of view of the first imaging unit 11.
Figure 30B:
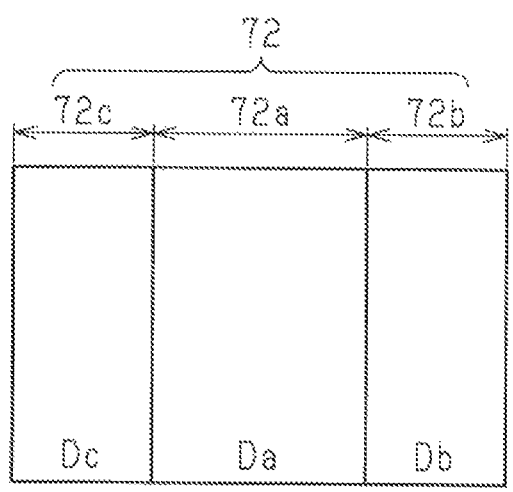

FIGS. 30A and 30B are diagrams illustrating an imaging operation in the first imaging unit 11 in a state in which focus is adjusted again to the region that deviates from the focus depth in a case where the region deviating from the focus depth D is included in the edge portion of the first angle of view within the first angle of view of the first imaging unit 11.

In a case where the imaging region 72 does not directly face the surveying instrument 1 and the surveying instrument 1 is in a state of being inclined with respect to the measurement surface 61, the edge portion of the imaging region 72 of the first angle of view is a defocus region deviating from the focus depth.

As an example, as illustrated in FIG. 30A, in a case where the imaging region 72 does not directly face the surveying instrument 1, an imaging region 72a narrower than the first angle of view is located in a focus depth Da. Imaging regions 72b and 72c, which are located on the opposite sides of the imaging region 72a, deviate from the focus depth Da and is defocused. The imaging region 72b is located at a position farther than the distance from the surveying instrument 1 to the imaging region 72a, and is located in a focus depth Db. The imaging region 72c is located at a position closer than the distance from the surveying instrument 1 to the imaging region 72a, and is located in a focus depth Dc.

As illustrated in FIG. 30B, in accordance with the control of the control unit 51, when capturing the image of the imaging region 72a, the surveying instrument 1 performs a control of reducing the first angle of view in the horizontal direction, and captures an image in a state in which the entirety of the imaging region 72a is focused.

Subsequently, in accordance with the control of the control unit 51, the surveying instrument 1 does not drive the horizontal angle drive unit 15, and adjust the focus to the imaging region 72b adjacent to the imaging region 72a. In accordance with the control of the control unit 51, the surveying instrument 1 performs a control of further reducing the first angle of view in the horizontal direction in comparison to the imaging of the imaging region 72a, and captures an image in a state of being focused to the entirety of the imaging region 72b.

In accordance with the control of the control unit 51, the surveying instrument 1 does not drive the horizontal angle drive unit 15, and adjusts the focus to the imaging region 72c adjacent to the imaging region 72a. In accordance with the control of the control unit 51, the surveying instrument 1 performs a control of further reducing the first angle of view in the horizontal direction in comparison to the imaging of the imaging region 72a, and captures an image in a state of being focused to the entirety of the imaging region 72c.

As an example, a region in which the imaging regions 72a, 72b, and 72c are combined is the imaging region 72 of the first angle of view.

FIG. 30 illustrates a configuration relating to the horizontal direction, but this is also true of a configuration relating to the vertical direction. That is, the farther the vertical angle deviates from 90° (270°), the larger the defocus region 78b becomes. In this case, as an example, the surveying instrument 1 controls the first imaging unit 11 to sequentially reduce the first angle of view in the vertical direction as the vertical angle deviates from 90° (270°) in accordance with the control of the control unit 51.

[Detection and Measurement of Cracks (Step S36)]

Figure 31:
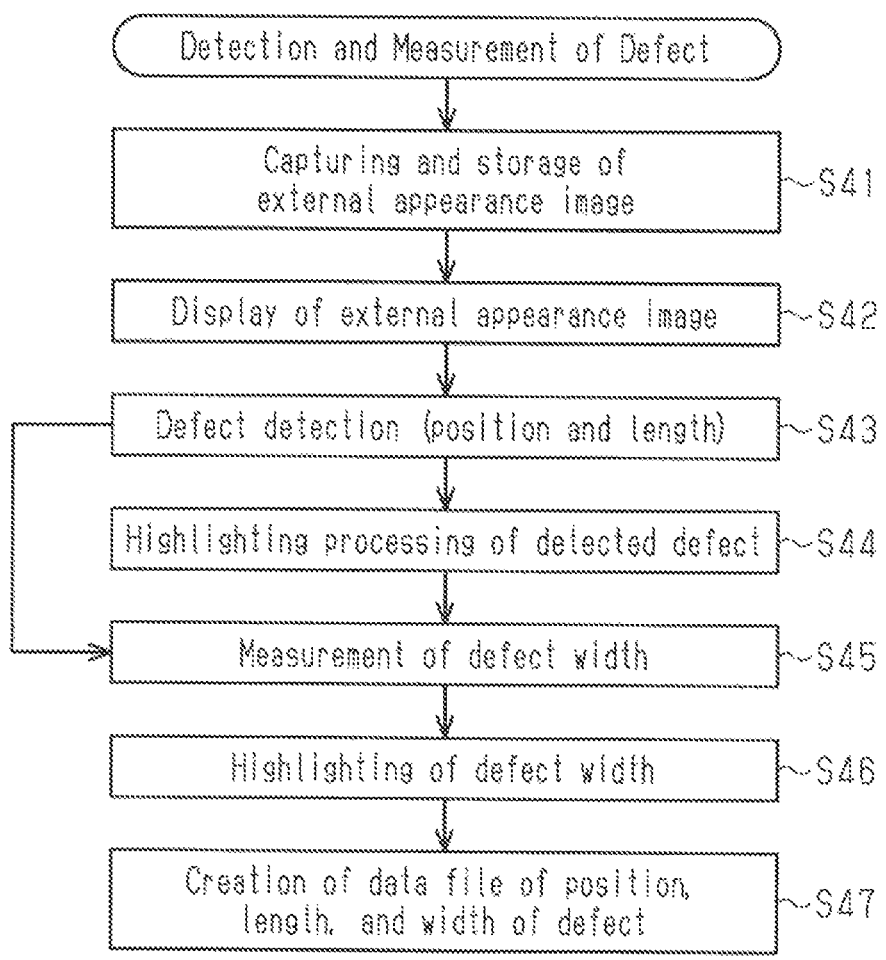
FIG. 31 is a flowchart illustrating a sequence of performing detection and measurement of cracks as one example of a defect.

FIG. 31 is a flowchart illustrating a sequence of detecting and measuring cracks as an example of a defect.

In step S41, the surveying instrument 1 captures the image of the imaging region 72 in the measurement range 62 in accordance with the control of the control unit 51. As an example, in accordance with the control of the control unit 51, when capturing the image of the imaging region 72, the surveying instrument 1 calculates angles (HA and VA) at an observation point indicated by the center of a reticle having a cross shape, and calculates global coordinate data of each pixel through conversion of the angles (HA and VA) from the observation point at the center. The surveying instrument 1 transmits external appearance image data that is captured, and global coordinate data correlated with the pixel to the defect detection apparatus 50.

Figure 32A:
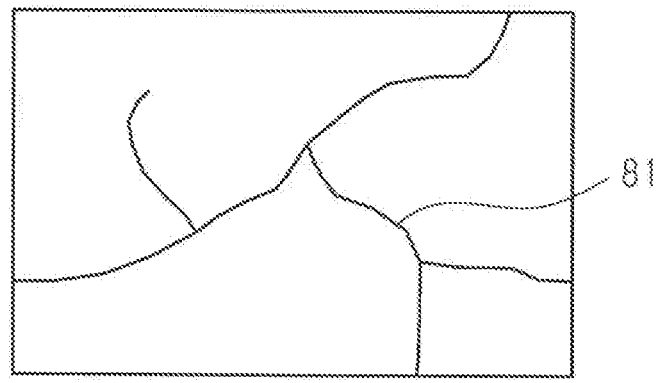
FIG. 32A is a diagram illustrating an external appearance image having cracks.

In step S42, the control unit 51 of the defect detection apparatus 50 sequentially displays an external appearance image based on the external appearance image data on the display unit 52. FIG. 32A illustrates an example of the external appearance image having a defect 81.

In step S43, the control unit 51 functions as a defect detection unit. The control unit 51 performs defect detection on each external appearance image data. The defect detection is performed by detecting contrast of the external appearance image. When detecting a defect, the control unit 51 calculates defect data indicating a defect position. As an example, the defect data is coordinate data that is identified by a global coordinate system. The defect data is coordinate data that identifies the defect position through conversion of an angle from the observation point O indicated by a reticle as position data. Specifically, the control unit 51 specifies global coordinate data corresponding to a pixel at the starting point of the defect 81. In addition, the control unit 51 identifies global coordinate data corresponding to a pixel at the end point of the defect 81. The control unit 51 calculates the distance between the starting point and the end point of the defect as length data of the defect. The control unit 51 displays information based on the defect data on the display unit 52 in combination with the external appearance image based on the external appearance image data.

As an example, the width of a crack or a concavity to be detected is not particularly limited, and is 0.2 mm or greater or 0.1 mm or greater as an example.

As an example, detection of the defect 81 may be performed by the surveying instrument 1.

Figure 32B:
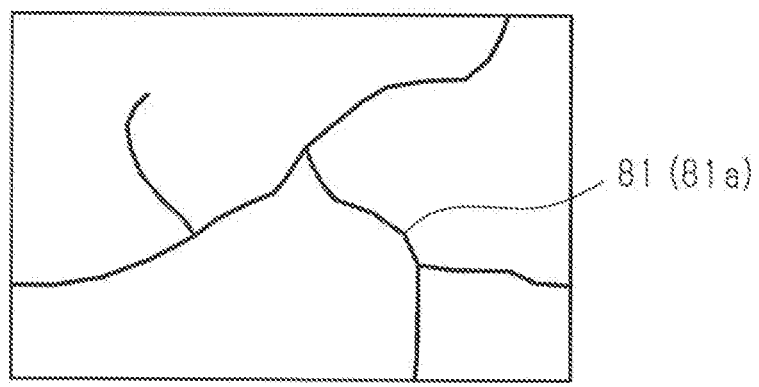
FIG. 32B is a diagram illustrating an external appearance image in which highlighting processing is performed for cracks.

In step S44, the control unit 51 performs highlighting processing for a defect that is detected. As illustrated in FIG. 32B, as an example, in the highlighting processing, a line 81a, which has a color different from a peripheral color or a different line type, is superimposed on the defect that is detected. As an example, step S44 may be omitted.

In step S45, the control unit 51 calculates width data of the defect that is defected. As an example, step S44 or the subsequent processing may be omitted in a case of performing only detection of the defect 81.

Figure 32C:
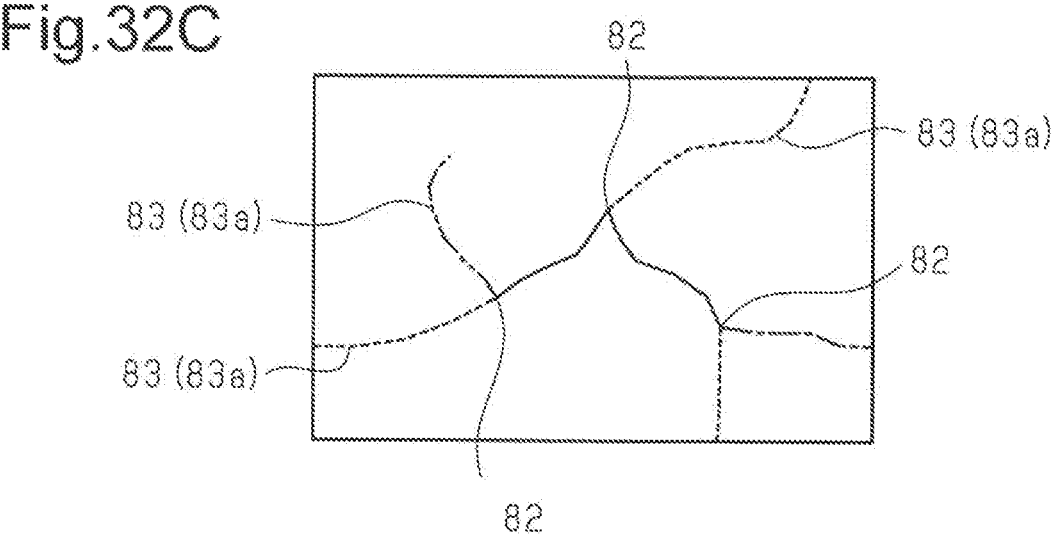
FIG. 32C is a diagram illustrating an external appearance image in which cracks are divided into segments and highlighting processing is performed for each segment.

In step S46, the control unit 51 detects a site at which a crack as the defect is bent or a site at which the width of the crack varies as a variation point 82. The control unit 51 treats a segment 83 between the variation points 82 adjacent to each other as one unit. The control unit 51 identifies global coordinate data corresponding to pixels at the starting point and the end point of the segment 83 as defect related data. The control unit 51 calculates the distance between the starting point and the end point of the segment 83 as length data of the segment 83. In addition, the control unit 51 calculates width data of the segment 83. As illustrated in FIG. 32C, as an example, the control unit 51 performs different highlighting processing for each segment 83. As an example, the control unit 51 performs the different highlighting processing for each segment 83 having the same width. As an example, in the highlighting processing, a line 83a, which has a color different from a peripheral color or a different line type, is superimposed on the segment 83.

In step S47, the control unit 51 creates a data file in which defect data relating to the defect is stored, and stores the data file in a folder of the storage unit 54.

Figure 33:
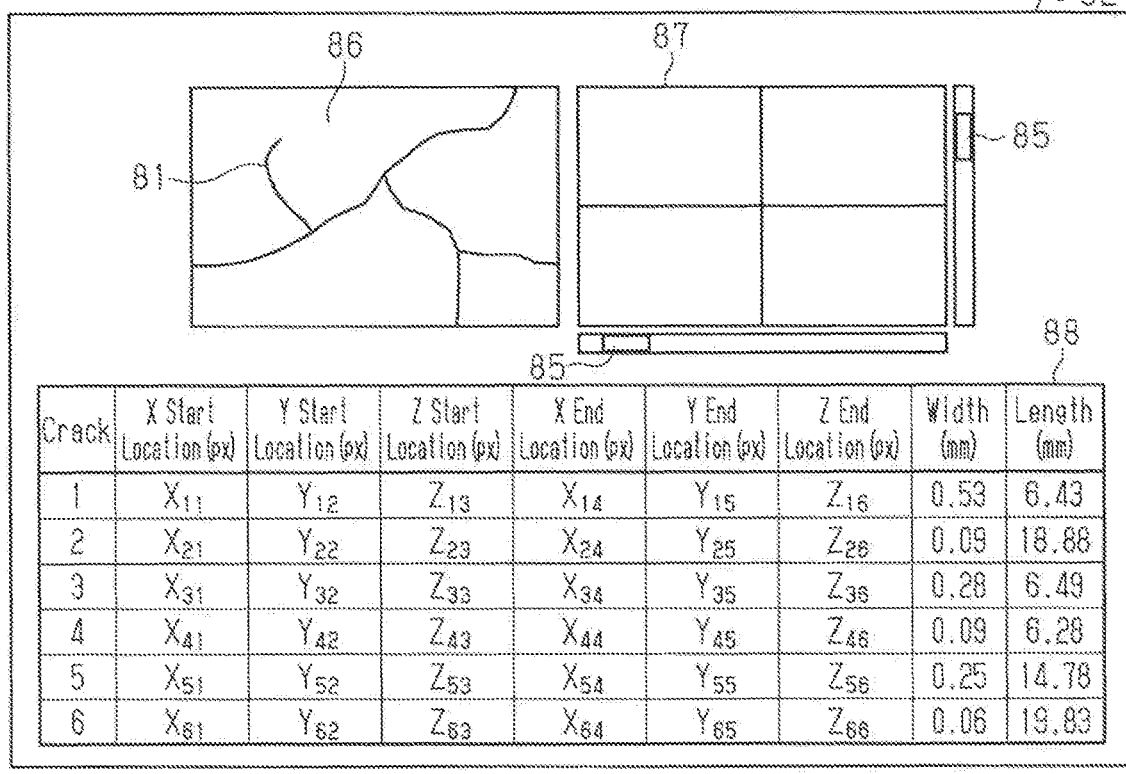
FIG. 33 is a diagram illustrating an example of an inspection screen that is displayed on a display unit of the defect detection apparatus.
Figure 34:
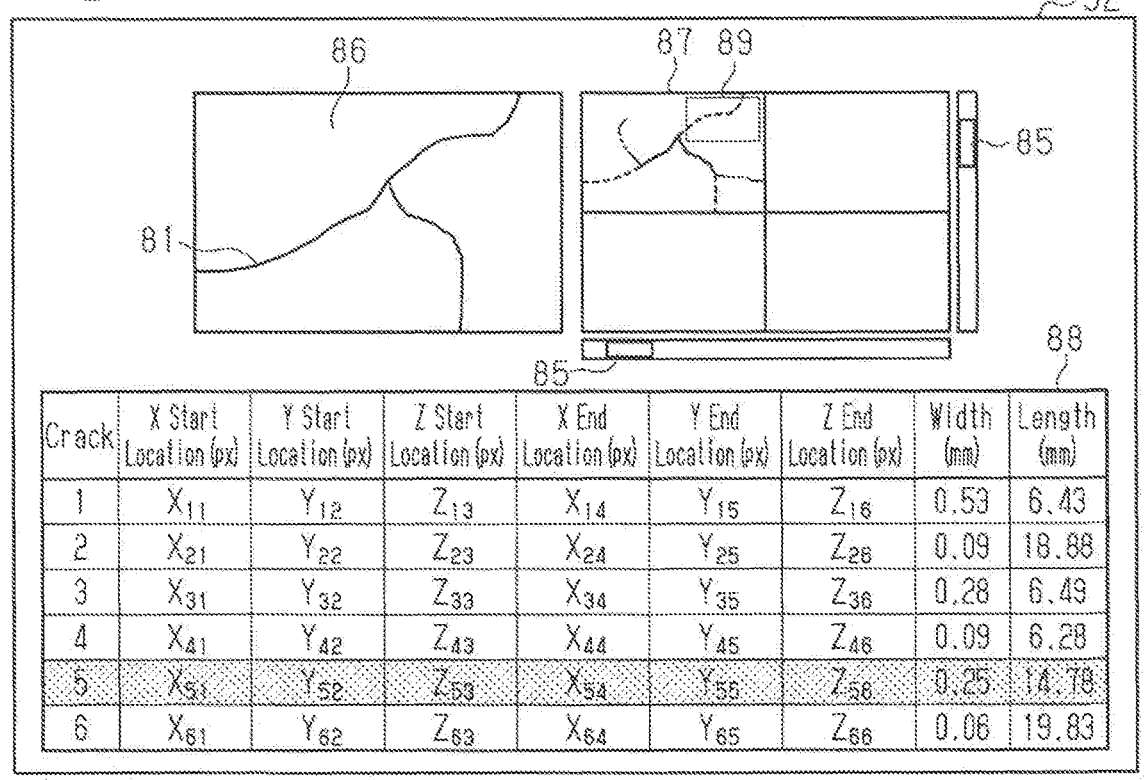
FIG. 34 is a diagram illustrating a display state subsequent to the inspection screen illustrated in FIG. 33.

FIG. 33 and FIG. 34 illustrate an example of an inspection screen that is displayed on the display unit 52 of the defect detection apparatus 50. As illustrated in FIG. 33, an external appearance image display object 86, a stitch image display object 87, and a list display object 88 are displayed on the display unit 52 as the inspection screen.

The external appearance image display object 86 displays an external appearance image based on external appearance image data that is lastly captured by the surveying instrument 1. The external appearance image display object 86 displays external appearance images based on the external appearance image data in the order of being captured.

As illustrated in FIG. 34, when the subsequent external appearance image data displayed on the external appearance image display object 86 is input to the defect detection apparatus 50, the external appearance image that is displayed on the external appearance image display object 86 is moved to the stitch image display object 87. As an example, the stitch image display object 87 sequentially displays external appearance images adjacent to each other in the order of capturing. As an example, the stitch image display object 87 displays horizontal and vertical scrollbars 85. In a case where external appearance images based on a large number of pieces of external appearance image data are displayed, the control unit 51 operates the scrollbars 85 with the operation unit 36 to scroll the stitch image display object 87 in vertical and horizontal directions. The user can view a desired external appearance image. As an example, the control unit 51 automatically strolls such that an external appearance image that is newly combined to the stitch image display object 87 is displayed. As an example, the control unit 51 displays a progress status indicating the number of images that have been displayed until now, among the total number of captured images on the stitch image display object 87.

As an example, in a case where first external appearance image data and second external appearance image data that are generated by sequentially capturing images in the surveying instrument are not subjected to stitching processing, a first external appearance image based on the first external appearance image data subjected to the orthorectification processing is displayed on the external appearance image display object 86. In a case where the stitching processing of the first external appearance image data and the second external appearance image data is performed, the control unit 51 displays a stitching-processed external appearance image based on a stitching-processed external appearance image data on the stitch image display object 87.

As an example, in a case where first external appearance image data and second external appearance image data that are generated by sequentially capturing images in the surveying instrument are not subjected to stitching processing, a first external appearance image based on the first external appearance image data subjected to the orthorectification processing is displayed on the external appearance image display object 86. In combination with the display, first defect information based on the first defect data relating to the first external appearance image data is displayed on the list display object 88. In a case where the stitching processing of the first external appearance image data and the second external appearance image data is performed, the control unit 51 displays a stitching-processed external appearance image based on a stitching-processed external appearance image data on the stitch image display object 87. In addition, the control unit 51 displays the first defect information based on the first defect data relating to the first external appearance image data and second defect information based on the second defect data relating to the second external appearance image data on the list display object 88.

As an example, when external appearance image data is moved to the stitch image display object 87, the defect detection processing is already terminated, and the orthorectification processing is already completed. The highlighting processing for the defect 81 or the segment 83 may be performed when being displayed on the external appearance image display object 86, or may be performed after being displayed on the stitch image display object 87.

In the list display object 88, a number that is identification data is given to each segment 83 of the defect 81 that is detected. The list display object 88 displays X coordinate data of starting point coordinate data, Y coordinate data of the starting point coordinate data, Z coordinate data of the starting point coordinate data, X coordinate data of end point coordinate data, Y coordinate data of the end point coordinate data, and Z coordinate data of the end point coordinate data, which are defect data. In addition, the list display object 88 displays width data and length data of the segment 83 for each segment 83 of the defect 81 that is detected.

In the external appearance image display object 86 and the stitch image display object 87, when one segment 83 is selected by the operation unit 53, the control unit 51 surrounds the selected segment 83 with a selection frame 89 such as a quadrangular shape as the highlighting processing. In addition, in the list display object 88, the control unit 51 performs highlighting such as half-tone dot meshing display on data of the selected segment 83. In the list display object 88, when one or more of the segments 83 are selected by the operation unit 53, the control unit 51 surrounds the selected segments 83 with the selection frame 89 having a quadrangular shape. As an example, the selection frame 89 has a circular shape, a triangular shape, and the like. As an example, the shape of the selection frame 89 is appropriately changed in accordance with a length or a shape of the segment 83. As an example, the control unit 51 surrounds continuous segments 83 having the same width with the selection frame 89.

Figure 35:
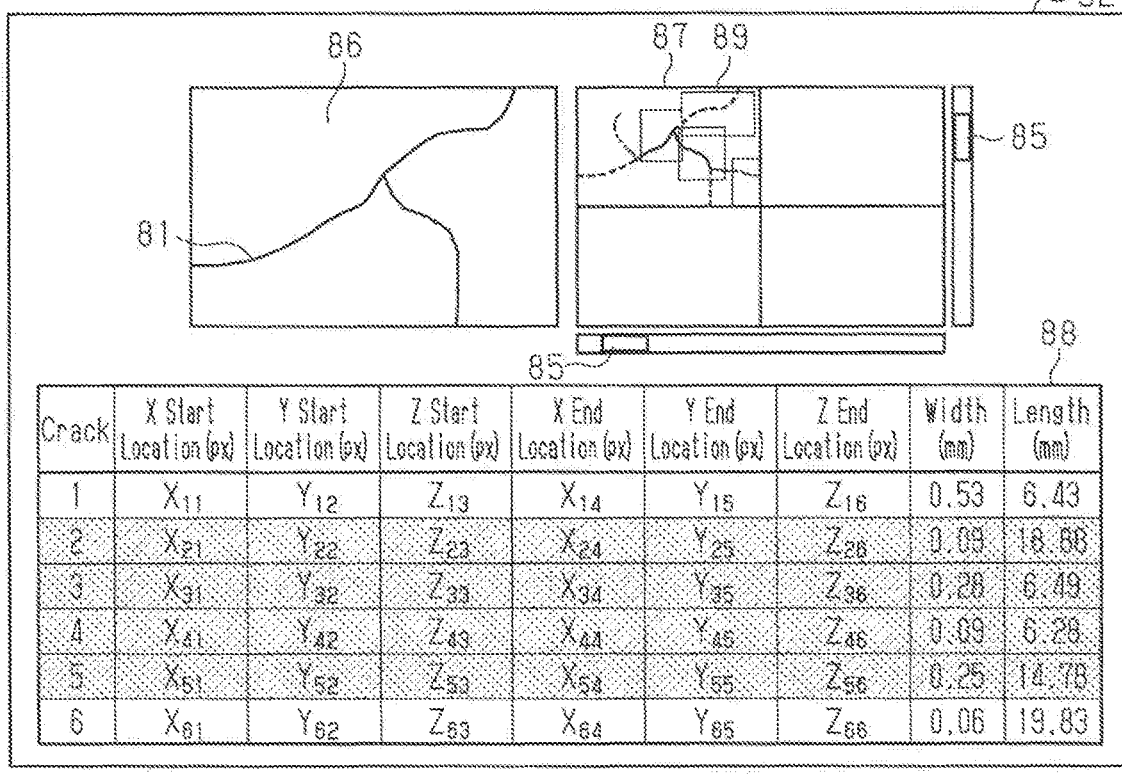
FIG. 35 is a diagram illustrating an inspection screen in a state in which a plurality of continuous segments are selected.

FIG. 35 is a diagram illustrating an inspection screen in a state in which a plurality of the continuous segments 83 are selected. As an example, when the plurality of continuous segments 83 are selected, the control unit 51 surrounds each of the selected continuous segments 83 with the selection frame 89, and performs highlighting such as half-tone dot meshing display on data of the selected segments 83 in the list display object 88. As an example, the control unit 51 automatically detects continuity of the defect 81 on the basis of the starting point coordinate data and the end point coordinate data of the segment 83 as the defect data. As an example, when a segment 83 that is the starting point and a segment 83 that is the end point are selected, segments 83, which are continuous between the starting point of the first segment 83 and the end point segment of the final segment 83, are detected and selected.

As an example, the control unit 51 calculates and displays starting point coordinate data, end point coordinate data, length data, the maximum value, the minimum value, and the average value of the width data, and the like of a defect 81 including the selected segments 83. As an example, the control unit 51 displays the ratio of the selected segments 83. For example, in the display by the control unit 51, a width of the crack in a range of 0.1 mm to 0.2 mm is displayed as X %, and a width of the crack in a range of 0.2 mm to 0.3 mm is displayed as Y %. As an example, even after the plurality of segments 83 are selected, a new segment 83 can be selected.

Figure 36:
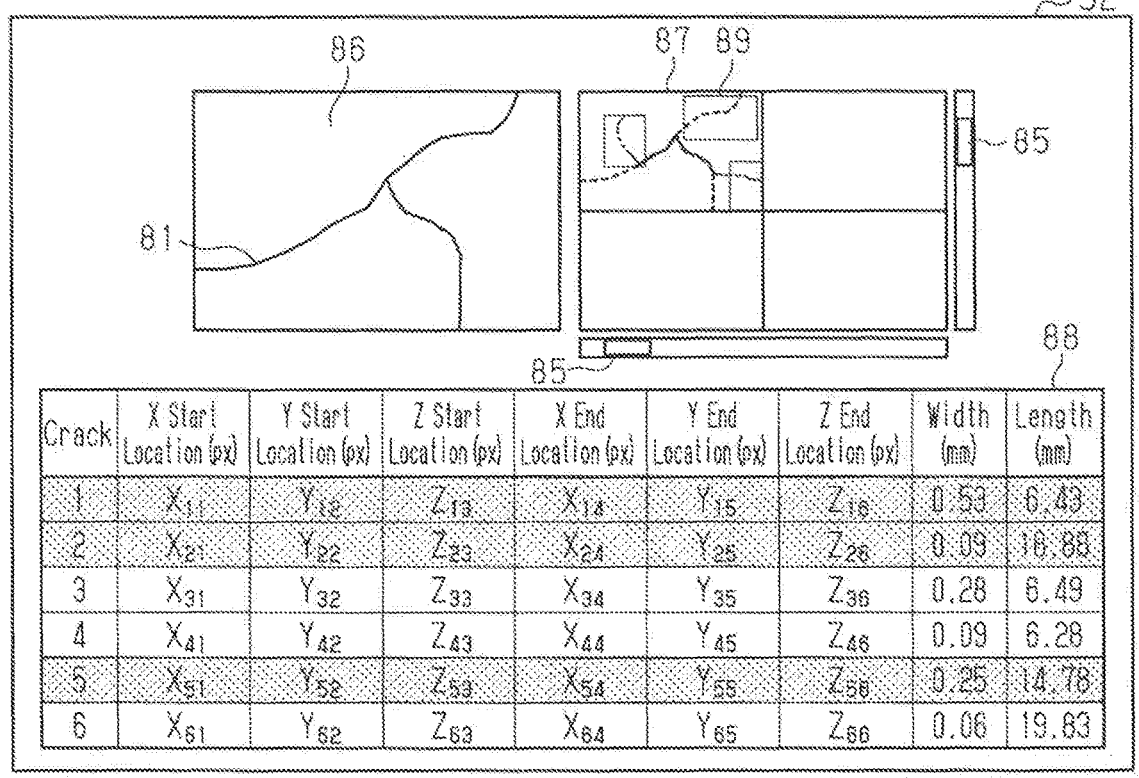
FIG. 36 is a diagram illustrating an inspection screen in a state in which a plurality of non-continuous segments are selected.

FIG. 36 is a diagram illustrating an inspection screen in a state in which a plurality of non-continuous segments 83 are selected. As an example, the control unit 51 displays the number of the selected segments 83, the total length of the selected segments 83, the average value of width data of the selected segments 83, the maximum value of the width data of the selected segments 83, the minimum value of the width data of the selected segments 83, and the like as defect data. As an example, the control unit 51 displays the ratio of the width data of the selected segments 83. For example, in the display by the control unit 51, width data of a crack in a range of 0.1 mm to 0.2 mm is displayed as X %, and width data of the crack in a range of 0.2 mm to 0.3 mm is displayed as Y %.

[Orthorectification Process (Step S37)]

Figure 37A:
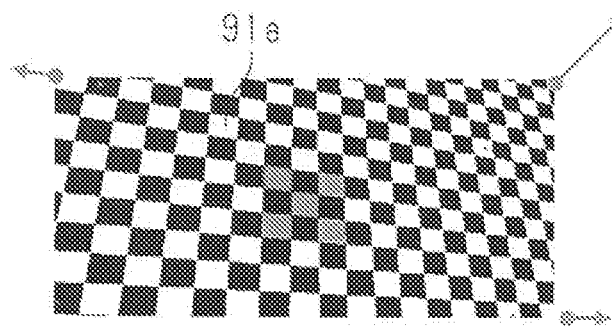
FIG. 37A is a diagram illustrating a state before orthorectification.
Figure 37B:
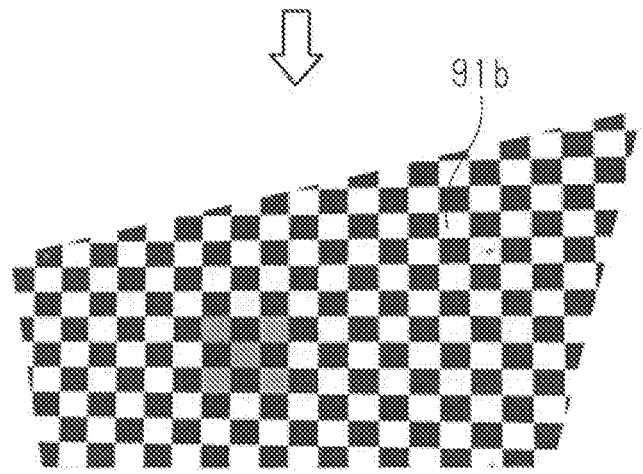
FIG. 37B is a diagram illustrating a state after orthorectification processing.

FIG. 37 is a diagram illustrating the orthorectification processing (orthographic projection correction processing), and FIG. 37A illustrates a state before the orthorectification, and FIG. 37B illustrates a state after the orthorectification.

As illustrated in FIG. 37A, in a case where the measurement surface 61 and the surveying instrument 1 do not directly face each other, a distortion occurs in an external appearance image 91*a* based on each external appearance image data. The external appearance image data that is captured can determine each pixel with global coordinates. The control unit 51 performs orthorectification processing in which external appearance image data is projected onto the measurement surface 61 by using global coordinate data of the pixel. As an example, the control unit 51 calculates global coordinate data of the four corners in each piece of the external appearance image data. The control unit 51 performs the orthorectification in which projection is performed to the measurement surface 61 on the basis of the global coordinate data of pixels at the four corners. When performing the orthorectification processing, consideration is also made to inclination data which is stored in the storage unit 54 and relates to the inclination of the first imaging element or the first optical system of the first imaging unit 11. According to this, external appearance images 91*b*, which are subjected to the orthorectification processing, are the same as the entirety of images captured in a state of directly facing the surveying instrument 1. The control unit 51 also performs the orthorectification processing for the defect 81 that is detected.

As an example, when performing the orthorectification processing, the external appearance image slightly deteriorates, and thus the orthorectification processing is performed after detection and measurement of cracks. The control unit 51 detects a defect from external appearance image data that is not subjected to the orthorectification processing. As an example, the orthorectification processing may be performed prior to detection and measurement of a width.

[Stitching Processing Unit (Step S38)]

The external appearance image data subjected to the orthorectification processing also has global coordinate data for each pixel.

As an example, in a case of connecting a plurality of pieces of adjacent external appearance image data, the control unit 51 connects the plurality of pieces of adjacent external appearance image data to each other such that pixels having the same coordinate value in the plurality of pieces of adjacent external appearance image data overlap each other.

As an example, even when not connecting the plurality of pieces of adjacent external appearance image data to each other, the control unit 51 adapts external appearance image data to coordinates on the basis of global coordinate data of the external appearance image data. In this case, the control unit 51 adapts the external appearance image data to the coordinates by using global coordinate data of a plurality of pixels such as global coordinate data of pixels in which global coordinate data of the center of each external appearance image data is arbitrary.

As an example, the plurality of pieces of adjacent external appearance image data include an overlapping part. The same global coordinate data is given to the overlapping part. When performing the stitching processing unit, the control unit 51 deletes the overlapping part of any one external appearance image data that is identified by the global coordinate data.

Figure 38:
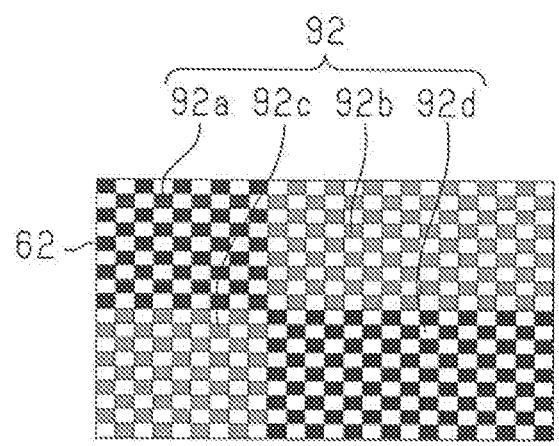
FIG. 38 is a diagram illustrating the entirety of external appearance images subjected to a stitching processing unit.

FIG. 38 is a diagram illustrating the entirety of external appearance images 92 in which the stitching processing unit of external appearance images 92*a* to 92*d* based on four pieces of external appearance image data is performed. The control unit 51 connects individual pieces of external appearance image data obtained by capturing the image the measurement range 62 to each other, and constructs the entirety of external appearance images 92 based on the entirety of pieces of external appearance image data of the measurement range 62.

As an example, the control unit 51 performs the stitching processing of connecting first external appearance image data subjected to the orthorectification processing and second external appearance image data subjected to the orthorectification processing by using first coordinate data correlated to the first external appearance image data and second coordinate data correlated to the second external appearance image data.

[Storage (Step S47)]

A plurality of pieces of the captured external appearance image data are stored in the folder of the storage unit 54. Global coordinate data of a pixel that constitutes each external appearance image data as position data is also stored in the folder in correlation with the external appearance image data. For example, the external appearance image data is stored in a JPEG format or a bit map format, and the coordinate data is stored in a text file. In addition, the external appearance image data and the coordinate data are stored in an EXIF format. A storage format of the external appearance image data may be data other than the JPEG format.

The control unit 51 stores the external appearance image data that is actually captured and the like in the folder of the storage unit 54. The control unit 51 stores external appearance image data subjected to the orthorectification processing, the entirety of pieces of external appearance image data obtained by subjecting the external appearance image data, which is subjected to the orthorectification processing, to the stitching processing unit, and the like in the folder of the storage unit 54. The control unit 51 stores the entirety of pieces of external appearance image data obtained by subjecting the external appearance image data before the orthorectification processing to the stitching processing unit, external appearance image data subjected to the highlighting processing for a defect, defect data, and the like in the folder of the storage unit 54.

The control unit 51 can perform measurement again on the external appearance image data that is stored after a performance improvement of the surveying instrument 1 or software is performed.

Figure 39:
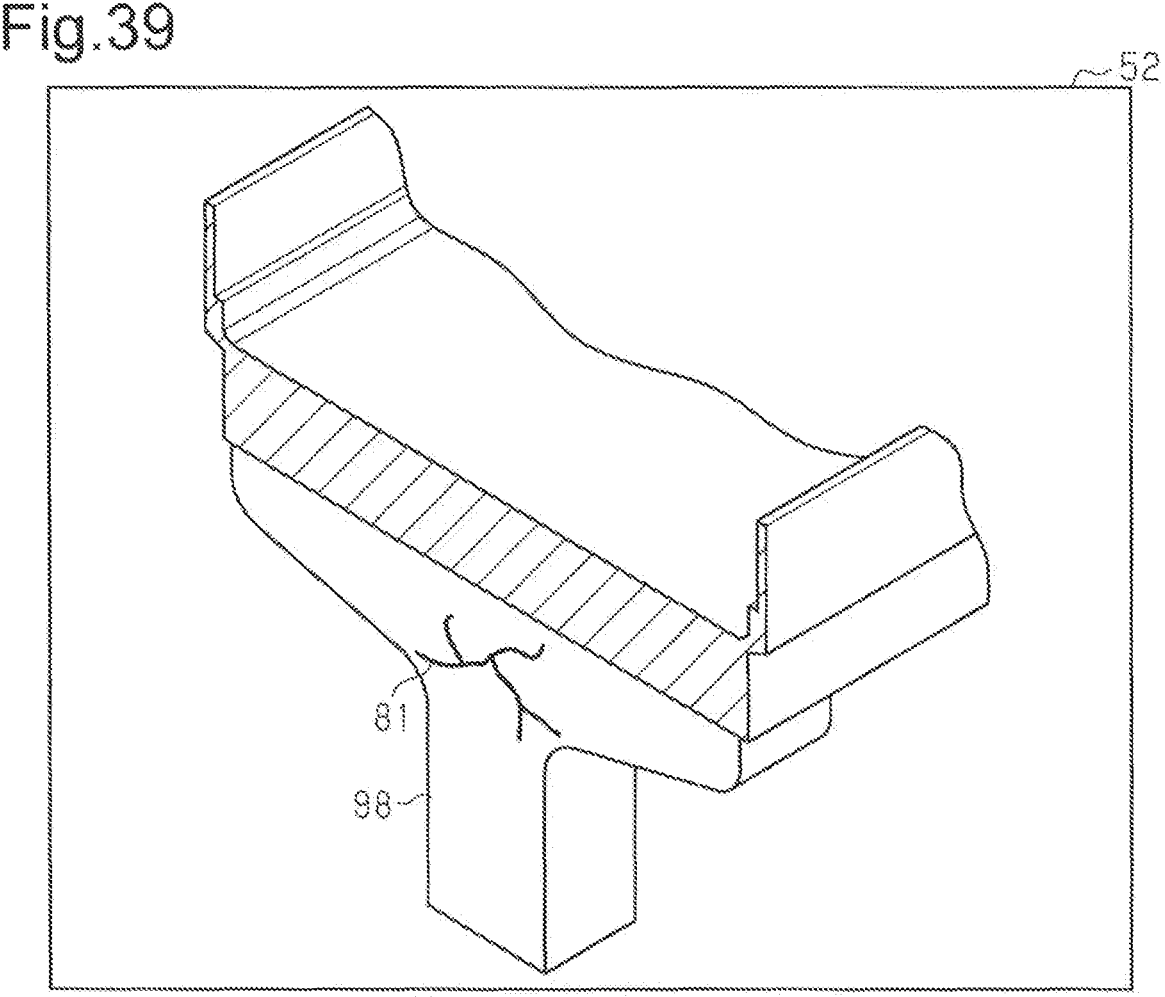
FIG. 39 is a diagram illustrating a state in which a defect is superimposed on map data.

The defect detection apparatus 50 can display the defect 81 on a map image based on map data created in a global coordinate system. As an example, the control unit 51 receives the map data from the map server device 56, and displays the image of a structure based on the map data on the display unit 52. As illustrated in FIG. 39, as an example, the structure is a bridge 98. In a case of inspecting the defect 81 of the bridge 98, the control unit 51 arranges the defect 81 included in the external appearance image data stored in the folder in a superimposed manner for the bridge 98. As an example, when designating the bridge 98 on the map data with the operation unit 53, the control unit 51 displays the defect 81 to be superimposed on the bridge 98 on the basis of the defect data of the defect 81. In addition, the defect 81 may be displayed in a state of being superimposed on the design data conforming to the global coordinates.

The above-described defect detection apparatus 50 has the following advantages.

(1) The external appearance image data captured by the surveying instrument 1 and the global coordinate data as position data of the external appearance image data that is input are input to the defect detection apparatus 50. Accordingly, it is also possible to calculate the global coordinate data as the defect data of the defect 81 that is included in the external appearance image data. The defect data conforms to the observation data that is measured by the surveying instrument 1, and thus the defect data is accurate data.

(2) The external appearance image based on the external appearance image data is displayed on the display unit 52 of the defect detection apparatus 50. The display unit 52 is a screen having a size greater than a size of the first display unit 18 and the second display unit 19 of the surveying instrument 1, and thus it is easy to visually observe the external appearance image and it is also easy to check the state of the defect 81.

(3) The defect data of the defect 81 is also displayed on the display unit 52 in combination with the external appearance image. The user can check the defect data while visually observing an actual defect 81.

(4) The defect detection apparatus 50 displays the external appearance image based on the external appearance image data on the display unit 52 each time the measurement range 62 in the measurement surface 61 is imaged by the surveying instrument 1. The user can check the external appearance image in real time when capturing the image.

(5) The defect 81 displayed on the display unit 52 is subjected to the highlighting processing, and thus the visibility is improved.

(6) The length data and the width data of the defect 81 are displayed as the defect data, and thus it is possible to grasp a specific length and a specific width of the defect 81 with a numerical value while visually observing the defect 81.

(7) With regard to the defect 81, it is possible to check the length data and the width data with a numerical value in a unit of the segment 83.

(8) The defect 81 is subjected to the highlighting processing in a unit of the segment 83, and thus the defect 81 is grasped in a unit of the segment 83.

(9) The external appearance image is subjected to the orthorectification processing, and thus the external appearance image is the same as the entirety of images captured in a state of directly facing the surveying instrument 1.

(10) When performing the orthorectification processing, consideration is also made to inclination data that is stored in the storage unit 54 and relates to the inclination of the first imaging unit 11 (the first imaging element) or the main body 6. According to this, the external appearance image 91b is subjected to accurate orthorectification processing.

(11) When performing the orthorectification processing, the external appearance image data slightly deteriorates. When detection of the defect 81 is performed before the orthorectification processing, the defect 81 is accurately detected.

(12) A plurality of pieces of external appearance image data obtained by capturing the image of the measurement range 62 are subjected to the stitching processing unit, and thus it is possible to visually observe the entirety of the measurement range 62 with a single external appearance image.

(13) The global coordinate data is correlated to each pixel of the external appearance image data, and thus the position data of the external appearance image data is accurate position data. The global coordinate data is also correlated to the defect data, and thus the defect data is accurate position data.

(14) The position data or the defect data is global coordinate data, and is thus versatile.

(15) The defect 81 can be displayed in a state of being superimposed on the map data created in the global coordinate system.

(16) The surveying instrument 1 can calculate accurate position data by performing distance measurement and angle measurement for measurement points that are collimated by the second imaging unit 12.

(17) The functions and uses are divided into the first imaging unit 11 and the second imaging unit 12. Accordingly, in the first imaging unit 11, it is possible to capture high-resolution external appearance image data in a telescopic manner. The second imaging unit 12 has a wide angle, and thus it is possible to easily perform collimation.

(18) The surveying instrument 1 performs angle measurement and distance measurement for at least arbitrary two points of a wall surface that is the measurement surface 61 to be measured, and defines a surface including the arbitrary two points as the measurement surface 61. According to this, the surveying instrument 1 can identify any point on the measurement surface 61 with the global coordinates.

(19) In a case where the measurement surface 61 is the vertical surface, the inclined surface, or the curved surface, generally, the imaging unit 7 is rotated around the horizontal axis O2 at a vertical angle in a range of 45° to 135° or in a range of 225° to 315° to capture external appearance image data.

(20) In a case of the ceiling surface, the imaging unit 7 is rotated around the horizontal axis O2 at a vertical angle in a range of 0° to 45° or in a range of 315° to 360° to capture external appearance image data.

(21) When capturing the image of a region including the outer edge of the measurement range 62, the first angle of view of the first imaging unit 11 is controlled such that a region protruding from the outer edge is reduced, and then the region is captured by the first imaging unit 11. According to this, the data size of the total imaging range 71 is reduced.

(22) When capturing the image of a region including the outer edge of the measurement range 62, the first imaging unit 11 is rotated by controlling the horizontal angle drive unit 15 and the vertical angle drive unit 17 such that a region protruding from the outer edge is reduced. According to this, the surveying instrument 1, which performs imaging, can reduce the number of images to be captured in the total imaging range 71.

(23) In a case where the measurement surface 61 is the vertical surface, the inclined surface, the curved surface, or the like, the horizontal angle drive unit 15 is controlled such that the amount of rotation of the first imaging unit 11 around the vertical axis increases as the vertical angle in a range of 0° to 180° deviates from 90°, or as the vertical angle in a range of 180° to 360° deviates from 270°. According to this, an overlapping part between adjacent imaging regions decreases, and it is possible to reduce the number of images to be captured.

(24) In a case where a region deviating from the focus depth is included in an edge portion of the first angle of view within the first angle of view, imaging is performed with the first imaging unit 11 by reducing the first angle of view so as not to include the region deviating from the focus depth, and the horizontal angle drive unit 15 and the vertical angle drive unit 17 are controlled to rotate the first imaging unit 11 such that the focus is adjusted to the region deviating from the focus depth, and then imaging is performed with the first imaging unit 11. According to this, capturing of an external appearance image in a defocused state is suppressed, and thus it is possible to accurately detect the defect 81.

(25) In a case where the region deviating from the focus depth is included in the edge portion of the first angle of view within the first angle of view, the first imaging unit 11 is not rotated, and imaging is performed with the first imaging unit 11 by adjusting the focus to the region deviating from the focus depth. According to this, capturing of the external appearance image in a defocused state is suppressed, and thus it is possible to accurately detect the defect 81.

(26) The external appearance image is captured by the first imaging unit 11, which is a telescopic camera, and thus it is possible to detect minute cracks.

The above-described defect detection apparatus 50 may be modified as follows.

Even in a case where the region deviating from the focus depth is included in the edge portion of the first angle of view within the first angle of view, the surveying instrument 1 does not necessarily need to perform processing in order for the region deviating from the focus depth not to be included in the first angle of view. The region deviating from the focus depth only needs to be captured in a focused state when capturing an adjacent imaging region.

Even when capturing the image of a vertical angle range of 0° to 180°, or a vertical angle range of 180° to 360°, a control of driving the horizontal angle drive unit 15 may not be performed.

When capturing the image of a region including the outer edge of the measurement range 62, when increase of overlapping parts 70 between a plurality of pieces of adjacent external appearance image data is permitted, the surveying instrument 1 does not necessarily need to perform a control of reducing the first angle of view, or a control of displacing the imaging region 72.

In a case where the first imaging unit 11 captures the image of the measurement range 62 in which the vertical angle is 0° to 45° or 315° to 360°, when controlling the horizontal angle drive unit 15 and the vertical angle drive unit 17 such that the first imaging unit 11 rotates in a concentric circular shape around the zenith or in a radiation direction passing through the zenith, an imaging sequence is not particularly limited.

In a case where the first imaging unit 11 captures the image of the measurement range 62 in which the vertical angle is 45° to 135° or 225° to 315°, an imaging sequence is not particularly limited.

Definition of the measurement surface 61 or definition of the measurement range 62 may be performed by designating three or more points.

The measurement range 62 may also be defined with two points designated when defining the measurement surface 61.

The defect detection apparatus 50 may be provided with the surveying instrument 1. In addition, the surveying instrument 1 may also function as the defect detection apparatus 50.

As an example, the position data and the defect data may be coordinate data conforming to a local coordinate system instead of the global coordinate system.

The position data or the defect data may be data that is calculated by GNSS of the surveying instrument 1.

The position data may be observation data including the angles (HA and VA) of the observation point of the external appearance image data input from the surveying instrument 1, or may be coordinate data correlated with a pixel of the observation point.

In a case where the defect data of the defect 81 is set as the global coordinate data, the defect data can be used in combination with data other than map data or design data which conforms to the global coordinates. In addition, the defect data of the defect 81 can be used in various kinds of software corresponding to the global coordinate system.

The method of the stitching processing unit is not particularly limited.

The orthorectification processing may be performed before the detection processing of the defect 81 not after the detection processing.

The orthorectification processing does not necessarily need to consider inclination data relating to the inclination of the first imaging element or the first optical system of the first imaging unit 11.

The orthorectification processing may be performed to connect partial portions common to adjacent images to each other.

The defect 81 or the segment 83 may be displayed in any form as long as the defect 81 or the segment 83 can be detected from the external appearance image data and defect data can be generated from the external appearance image data. For example, the defect 81 or the segment 83 does not necessarily need to be subjected to the highlighting processing.

The defect 81 does not necessarily need to be divided into the segment 83 in accordance with a variation point.

The defect data only needs to include at least position data of a starting point and an end point of the defect 81.

A display sequence of the external appearance image displayed on the display unit 52 of the defect detection apparatus 50 is not limited to an imaging sequence.

The external appearance image and the defect data does not necessarily need to be displayed on the same screen in the display unit 52 of the defect detection apparatus 50.

The external appearance image and the defect data may be displayed in the same window or windows different from each other.

As an example, the surveying instrument 1 calculates global coordinate data of the entirety of pixels in accordance with the definition of the measurement surface 61 as position data of each piece of the captured external appearance image data, and outputs the global coordinate data to the defect detection apparatus 50. In this case, the defect detection apparatus 50 identifies the defect data indicating the position of the defect 81 that is detected with the global coordinate data that is correlated with the entirety of pixels.

As an example, as the position data of each piece of the captured external appearance image data, the surveying instrument 1 calculates global coordinate data of a predetermined position, which is determined in advance, of the external appearance image data, for example, the center indicated by a reticle, and outputs the global coordinate data to the defect detection apparatus 50. In this case, for a pixel for which the global coordinate data is not calculated, the defect detection apparatus 50 performs conversion of an angle from the observation point O in accordance with the definition of the measurement surface 61 to calculate the global coordinate data. In addition, the defect detection apparatus 50 identifies the defect data indicating the position of the detected defect 81 with the global coordinate data that is correlated with the entirety of pixels.

As an example, as the position data of each piece of the captured external appearance image data, the surveying instrument 1 outputs observation data including the angles (HA and VA) of the observation point O that is the center indicated, for example, by a reticle in the external appearance image data to the defect detection apparatus 50. In this case, the defect detection apparatus 50 calculates the global coordinate data of each pixel of the external appearance image data through conversion of angles from the observation point O in accordance with the definition of the measurement surface 61. In addition, the defect detection apparatus 50 identifies the defect data indicating the position of the detected defect 81 with the global coordinate data that is correlated with the entirety of pixels.

Detection of the defect 81 may be performed by the defect detection apparatus 50 or the surveying instrument 1.

The defect may be a crack or a concavity on a road or a landing strip other than a crack on a wall surface. In addition, the defect may be a crack and the like that are formed through deterioration of a steel frame that is a part of a structure such as a bridge girder. The defect is not limited to the crack or the concavity as long as the defect can be detected by the imaging apparatus in accordance with contrast.

DESCRIPTION OF THE REFERENCE NUMERALS

1 . . . Surveying instrument; 2 . . . Leveling portion; 3 . . . Bottom plate; 4 . . . Upper plate; 5 . . . Leveling screw; 6 . . . Main body; 7 . . . Imaging unit; 8 . . . First objective lens; 9 . . . Second objective lens; 10 . . . Third objective lens; 11 . . . First imaging unit; 11a . . . Auto focus unit; 12 . . . Second imaging unit; 13 . . . Distance measurement unit; 14 . . . Third imaging unit; 15 . . . Horizontal angle drive unit; 17 . . . Vertical angle drive unit; 18 . . . First display unit; 19 . . . Second display unit; 20 . . . Communication unit; 21 . . . Horizontal angle operation encoder; 22 . . . Vertical angle operation encoder; 23 . . . Horizontal angle operation unit; 24 . . . Vertical angle operation unit; 25 . . . Gripping unit; 31 . . . Horizontal angle measurement unit; 32 . . . Vertical angle measurement unit; 33 . . . Image processing unit; 34 . . . Temporary storage unit; 35 . . . Storage unit; 36 . . . Operation unit; 37 . . . Inclination detection unit; 40 . . . Control unit; 49 . . . External power supply; 50 . . . Defect detection apparatus; 51 . . . Control unit; 51a . . . CPU; 51b . . . ROM; 51c . . . RAM; 51d . . . Defect detection program; 52 . . . Display unit; 53 . . . Operation unit; 54 . . . Storage unit; 55 . . . Communication unit; 60 . . . Wall surface; 61 . . . Measurement surface; 61a . . . Flat surface; 61b . . . Approximated plane; 62 . . . Measurement range; 62a . . . Measurement range; 63 . . . Imaging range; 64 . . . Global coordinates; 65 . . . Rectangle; 66 . . . Rectangle; 66a . . . Region for which observation is partially impossible; 66b . . . Unnecessary region; 67 . . . Rectangle; 67a . . . Rectangle; 68 . . . Rectangle; 68a . . . Triangle; 69 . . . Shape other than rectangle; 70 . . . Overlapping part; 71 . . . Total imaging range; 72 . . . Imaging region; 72a to 72c . . . Imaging regions; 73 . . . Exclusion region; 74 . . . Route; 75 . . . Region that expands; 76 . . . Region that protrudes from outer edge; 77a . . . horizontal angle-equivalent range; 77b . . . horizontal angle-equivalent range; 81 . . . Defect; 81a . . . Line; 82 . . . Variation point; 83 . . . Segment; 83a . . . Line; 85 . . . Scrollbar; 86 . . . External appearance image display object; 87 . . . Stitch image display object; 88 . . . List display object; 89 . . . Selection frame; 91a . . . External appearance image; 91b . . . External appearance image; 92 . . . Entirety of external appearance image; 92a . . . External appearance image; 92b . . . External appearance image; 92c . . . External appearance image; 92d . . . External appearance image; 98 . . . Bridge pier.

The invention claimed is:

1. A defect detection apparatus comprising:
  a measurement surface definition unit that defines a measurement surface based on angle and distance measurements associated with at least a first observation point and a second observation point on an external appearance of a structure, wherein the angle and distance measurements are relative to a surveying instrument and obtained with the surveying instrument;
  a defect detection unit that detects a structural defect of the structure that appears on the external appearance of the structure through imaging processing from external appearance image data that is generated by imaging the external appearance of the structure in the defined measurement surface with the surveying instrument, wherein the defect detection unit includes a first imaging unit and a second imaging unit, and wherein the defect detection unit detects the structural defect of the structure by analyzing an image obtained by the first imaging unit or the second imaging unit and measuring a contrast in the image; and
  a calculation unit that:
    obtains angles of a third observation point corresponding to a reference position in the external appearance image data;

converts at least one position, other than the reference position, in the external appearance image data into coordinate data based on the obtained angles and the defined measurement surface; and calculates defect data relating to the detected structural defect based on a portion of the coordinate data corresponding to a portion of the external appearance image data associated with the detected structural defect.

2. The defect detection apparatus according to claim 1, wherein the coordinate data is a global coordinate value that is correlated with a pixel that constitutes the external appearance image data.

3. The defect detection apparatus according to claim 1, further comprising an orthorectification processing unit that performs orthorectification processing on the external appearance image data by using the coordinate data.

4. The defect detection apparatus according to claim 3, wherein the orthorectification processing unit performs the orthorectification processing on each of first external appearance image data generated by performing imaging with the surveying instrument and second external appearance image data generated by performing imaging with the surveying instrument, and the defect detection apparatus further comprises a stitching processing unit that performs stitching processing of connecting the first external appearance image data subjected to the orthorectification processing by the orthorectification processing unit and the second external appearance image data subjected to the orthorectification processing by the orthorectification processing unit to each other by using first coordinate data that is correlated with the first external appearance image data and second coordinate data that is correlated with the second external appearance image data.

5. The defect detection apparatus according to claim 4, wherein the first external appearance image data and the second external appearance image data are image data that is generated by sequentially performing imaging with the surveying instrument, the defect detection apparatus further comprises a display control unit, in a case where the stitching processing unit does not perform the stitching processing of connecting the first external appearance image data subjected to the orthorectification processing by the orthorectification processing unit and the second external appearance image data subjected to the orthorectification processing by the orthorectification processing unit to each other, the display control unit displays a first external appearance image based on the first external appearance image data subjected to the orthorectification processing on a display unit, in a case where the stitching processing unit performs the stitching processing of connecting the first external appearance image data subjected to the orthorectification processing by the orthorectification processing unit and the second external appearance image data subjected to the orthorectification processing by the orthorectification processing unit to each other, the display control unit displays a stitching-processed external appearance image based on a stitching-processed external appearance image data subjected to the stitching processing by the stitching processing unit on the display unit.

6. The defect detection apparatus according to claim 5, wherein in a case where the stitching processing unit does not perform the stitching processing of connecting the first external appearance image data subjected to the orthorectification processing by the orthorectification processing unit and the second external appearance image data subjected to the orthorectification processing by the orthorectification processing unit to each other, the display control unit displays a first external appearance image based on the first external appearance image data subjected to the orthorectification processing by the orthorectification processing unit and first defect information based on first defect data relating to the first external appearance image data that is calculated by the calculation unit in the display unit, and in a case where the stitching processing unit performs the stitching processing of connecting the first external appearance image data subjected to the orthorectification processing by the orthorectification processing unit and the second external appearance image data subjected to the orthorectification processing by the orthorectification processing unit to each other, the display control unit displays a stitching-processed external appearance image based on the stitching-processed external appearance image data subjected to the stitching processing by the stitching processing unit, the first defect information based on the first defect data relating to the first external appearance image data calculated by the calculation unit, and second defect information based on second defect data relating to the second external appearance image data calculated by the calculation unit on the display unit.

7. The defect detection apparatus according to claim 6, wherein the first defect information includes a position, a length, and a width of a defect, and the second defect information includes a position, a length, and a width of a defect.

8. The defect detection apparatus according to claim 1, further comprising a display control unit that controls display of a display unit, wherein the display control unit displays a position of the defect based on the coordinate data on the display unit in combination with a map image in order for a user to identify the position.

9. The defect detection apparatus according to claim 1, further comprising the surveying instrument, which includes a surveying unit that surveys the structure, an imaging unit that images the structure, a horizontal angle drive unit that rotates the surveying unit and the imaging unit around a vertical axis of the surveying instrument, a vertical angle drive unit that rotates the surveying unit and the imaging unit around a horizontal axis of the surveying instrument, an angle detection unit that detects an angle in a collimation direction with respect to a reference direction, and a control unit that controls the horizontal angle drive unit and the vertical angle drive unit, and controls the imaging unit to generate external appearance image data by imaging the structure.

10. The defect detection apparatus according to claim 9, wherein the imaging unit includes a first imaging unit having a first angle of view and a second imaging unit having a second angle of view, which is wider than the first angle of view, the control unit defines a measurement surface by performing distance measurement and angle measurement for each of at least two points of the structure.

11. The defect detection apparatus according to claim 10, wherein the control unit sets a measurement range in the defined measurement surface by performing the distance measurement and the angle measurement for each of the at least two points of the structure.

12. The defect detection apparatus according to claim 11, wherein, when the first imaging unit sequentially images the measurement range at a vertical angle in a range of 45° to 135° or in a range of 225° to 315°, the control unit preferentially sets an imaging region that is imaged subsequently to a current imaging region as an imaging region that is adjacent to the current imaging region.

13. The defect detection apparatus according to claim 11, wherein, when the first imaging unit sequentially images the measurement range at a vertical angle in a range of 0° to 45° or in a range of 315° to 360°, the control unit moves the first imaging unit in a concentric circular shape around a zenith or in a radiation direction passing through the zenith.

14. The defect detection apparatus according to claim 11, wherein, in a case where the first imaging unit sequentially images the measurement range, when imaging a region including the outer edge of the measurement range, the control unit controls the first angle of view of the first imaging unit such that a region protruding from the outer edge is reduced.

15. The defect detection apparatus according to claim 11, wherein, in a case where the first imaging unit sequentially images the measurement range, when imaging a region including the outer edge of the measurement range, the control unit moves the first imaging unit such that a region protruding from the outer edge is reduced without changing the first angle of view.

16. The defect detection apparatus according to claim 11, wherein the control unit moves the first imaging unit such that the amount of rotation of the first imaging unit around the vertical axis increases as the vertical angle in a range of 0° to 180° deviates from 90°, or as the vertical angle in a range of 180° to 360° deviates from 270°.

17. The defect detection apparatus according to claim 11, wherein in a case where a region deviating from a focus depth is included in an edge portion of the first angle of view within the first angle of view, the control unit reduces the first angle of view so as not to include the region deviating from the focus depth and performs imaging with the first imaging unit, and the control unit moves the first imaging unit such that a focus is adjusted to the region deviating from the focus depth and performs imaging with the first imaging unit.

18. The defect detection apparatus according to claim 11, wherein in a case where a region deviating from a focus depth is included in an edge portion of the first angle of view within the first angle of view, the control unit performs imaging with the first imaging unit by adjusting a focus to the region deviating from the focus depth without moving the first imaging unit.

19. The defect detection apparatus according to claim 1, wherein the structural defect is a crack that appears on the external appearance of the structure.

20. The defect detection apparatus according to claim 1, wherein the defect detection unit is configured to detect the structural defect of the structure due to deterioration of the structure that appears on an external appearance of the structure through the imaging processing from the external appearance image data.

21. A non-transitory computer-readable storage medium comprising a program stored thereon, the program, when executed by circuitry, being configured to cause the circuitry to:

define a measurement surface based on angle and distance measurements associated with at least a first observation point and a second observation point on an external appearance of a structure, wherein the angle and distance measurements are relative to a surveying instrument and obtained with the surveying instrument;

detect a structural defect of the structure that appears on the external appearance of the structure through imaging processing from external appearance image data that is generated by imaging the external appearance of the structure in the defined measurement surface with the surveying instrument, wherein the surveying instrument includes a first imaging unit and a second imaging unit, and wherein the defect detection unit detects the structural defect of the structure by analyzing an image obtained by the first imaging unit or the second imaging unit and measuring a contrast in the image;

obtain angles of a third observation point corresponding to a reference position in the external appearance image data;

convert at least one position, other than the reference position, in the external appearance image data into coordinate data based on the obtained angles and the defined measurement surface; and calculate defect data relating to the detected structural defect based on a portion of the coordinate data corresponding to a portion of the external appearance image data associated with the detected structural defect.

22. The non-transitory computer-readable storage medium according to claim 21, wherein the program, when executed by the circuitry, is configured to cause the circuitry to detect the structural defect of the structure due to deterioration of the structure that appears on an external appearance of the structure through the imaging processing from the external appearance image data.

* * * * *